(12) United States Patent
Kang et al.

(10) Patent No.: US 7,626,308 B2
(45) Date of Patent: Dec. 1, 2009

(54) PERMANENT MAGNET EXCITED TRANSVERSE FLUX MOTOR WITH OUTER ROTOR

(75) Inventors: Do Hyun Kang, Changwon-si (KR); Jung Hwan Chang, Changwon-si (KR); Ji Won Kim, Busan (KR)

(73) Assignee: Korea Electrotechnology Research Institute, Changwon-si (KR)

( * ) Notice: Subject to any disclaimer, the term of this patent is extended or adjusted under 35 U.S.C. 154(b) by 209 days.

(21) Appl. No.: 11/647,044

(22) Filed: Dec. 28, 2006

(65) Prior Publication Data
US 2007/0152528 A1 Jul. 5, 2007

(30) Foreign Application Priority Data
Dec. 29, 2005 (KR) .................. 10-2005-0132833

(51) Int. Cl.
*H02K 1/12* (2006.01)
(52) U.S. Cl. .................. 310/254; 310/216; 310/261
(58) Field of Classification Search .................. 310/43, 310/254, 258–259, 216, 261, 156.02, 156.55
See application file for complete search history.

(56) References Cited
U.S. PATENT DOCUMENTS

| 4,103,195 | A | * | 7/1978 | Torossian et al. | 310/259 |
| 4,220,883 | A | * | 9/1980 | Padoan | 310/216 |
| 4,330,726 | A | * | 5/1982 | Albright et al. | 310/254 |
| 4,593,223 | A | * | 6/1986 | Lehoczky | 310/258 |
| 4,900,965 | A | * | 2/1990 | Fisher | 310/216 |
| 5,025,201 | A | * | 6/1991 | Berger | 318/605 |
| 5,323,079 | A | * | 6/1994 | Nieves et al. | 310/213 |
| 6,448,686 | B1 | * | 9/2002 | Dawson et al. | 310/254 |
| 6,833,638 | B2 | * | 12/2004 | Kang et al. | 310/12 |
| 6,849,969 | B2 | * | 2/2005 | Kang et al. | 310/12 |
| 7,135,802 | B2 | * | 11/2006 | Seki et al. | 310/257 |
| 7,164,220 | B2 | * | 1/2007 | Gilmour et al. | 310/266 |

* cited by examiner

*Primary Examiner*—Thanh Lam
(74) *Attorney, Agent, or Firm*—Frommer Lawrence & Haug LLP; Ronald R. Santucci

(57) ABSTRACT

Disclosed herein is a permanent magnet-excited transverse flux motor with an outer rotor. The permanent magnet-excited transverse flux motor comprises: a stator including a stator powdered iron core formed by an extruded molding through a mold, a pair of stator laminated iron cores stacked respectively at an upper layer portion and a lower layer portion of an outer circumference of the stator powdered iron core in such fashion as to be spaced apart from each other by a certain interval, and a stator winding interposed between the upper layer portion and the lower layer portion in such fashion as to be wound around the stator powdered iron core to form a multiple coil through which current flows; and a rotor including a plurality of rotor permanent magnets and a plurality of rotor powdered iron cores disposed on the outer circumference of the stator in such a fashion as to be are alternately arranged adjacent to one another.

10 Claims, 22 Drawing Sheets

PERMANENT MAGNET EXCITED TRANSVERSE FLUX MOTOR WITH OUTER ROTOR

CROSS-REFERENCE TO RELATED APPLICATIONS

This application claims the benefit under 35 U.S.C. §119(a) of Korean Patent Application No. 10-2005-132833, filed in the Korean Intellectual Property Office on Dec. 29, 2005, the entire disclosure of which is incorporated herein by reference.

BACKGROUND OF THE INVENTION

1. Field of the Invention

The present invention relates to a permanent magnet excited transverse flux motor with an outer rotor, in which an axial and/or radial laminated structure is applied to a stator powdered iron core, so that the motor has a relatively simple structure, can increase power-generating efficiency with high output power, and can reduce noise and vibration.

2. Background of the Related Art

In generally, an electric motor is a kind of machine that converts electric energy into mechanical energy. The electric motor basically requires the performance of high output power (output power/motor weight: Kw/kg) and high efficiency (output/input), and can be classified into a longitudinal flux motor and a transverse flux motor depending on the flow direction of magnetic flux. The longitudinal flux motor refers to a motor that the flow direction of the magnetic flux is identical to a movement direction of the motor, and the transverse flux motor refers to a motor that the flow direction of the magnetic flux is perpendicular to the movement direction of the motor.

That is, in case of the longitudinal flux motor, the direction of current being applied is perpendicular to the movement direction of the motor. In case of the transverse flux motor, the direction of current being applied is identical to the movement direction of the motor.

Here, since the transverse flux motor enables the mutual separation between a space (electric circuit) in which to implement windings and a space (magnetic circuit) in which to allow magnetic flux to flow, it can ensure high output power density and enables shape designs of various types as compared to the longitudinal flux motor in which the electric circuit and the magnetic circuit are interconnected.

In addition, the transverse flux motor implements the windings in the form of a ring, leading a decrease in the amount of copper and its loss as compared to the longitudinal flux motor having a number of end windings.

Nevertheless, the transverse flux motor entails a drawback that since the motor generally causes a three-dimensional flux flow, its manufacture is not easy and it is not easy to adopt a laminated type structure suitable for the three-dimensional flux flow as compared to an existing longitudinal flux motor.

SUMMARY OF THE INVENTION

Accordingly, an aspect of exemplary embodiments of the present invention has been made in view of the aforementioned problems occurring in the prior art, and it is an object of the present invention to provide a permanent magnet-excited transverse flux motor with an outer rotor, in which an axial and/or radial laminated structure is applied to an stator powdered iron core, so that a considerable amount of core loss generated is reduced to thereby increase output power density and power-generating efficiency and reduce noise and vibration so as to implement a relative simple structure.

To accomplish the above object, according to one aspect of exemplary embodiments of the present invention, there is provided a permanent magnet-excited transverse flux motor with an outer rotor, which comprises:

a stator including a stator powdered iron core formed by an extruded molding through a mold, a pair of stator laminated iron cores stacked respectively at an upper layer portion and a lower layer portion of an outer circumference of the stator powdered iron core in such fashion as to be spaced apart from each other by a certain interval, and a stator winding interposed between the upper layer portion and the lower layer portion in such fashion as to be wound around the stator powdered iron core in the form of a multiple coil through which current flows; and a rotor including a plurality of rotor permanent magnets and a plurality of rotor powdered iron cores disposed on the outer circumference of the stator in such a fashion as to be are alternately arranged adjacent to one another.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiment of the present invention with reference to the attached drawings.

Figure 1:
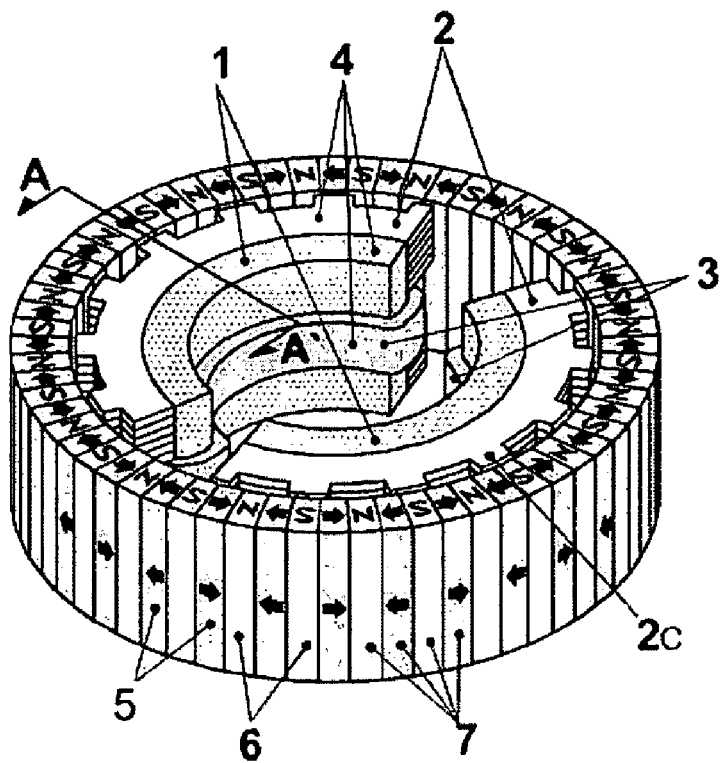
FIG. 1 is a perspective view illustrating the construction of a permanent magnet-excited transverse flux motor with an outer rotor according to the present invention.

FIG. 1 is a perspective view illustrating the construction of a permanent magnet-excited transverse flux motor with an outer rotor according to the present invention.

Referring to FIG. 1, the permanent magnet-excited transverse flux motor with an outer rotor comprises: a stator 4 including a stator powdered iron core 1 formed by an extruded molding through a mold, a pair of stator laminated iron cores 2 and a stator winding 3; and a rotor 7 including a plurality of rotor permanent magnets 5 and a plurality of rotor powdered iron cores 6. The stator 4 is formed of a two-phase structure in which a pair of stators are disposed to be opposed to each other.

Specifically, between each stator 4 and the rotor 7 is defined an air gap δ so that a repulsive force and an attractive force are induced between the stator 4 and the rotor 7.

Figure 2:
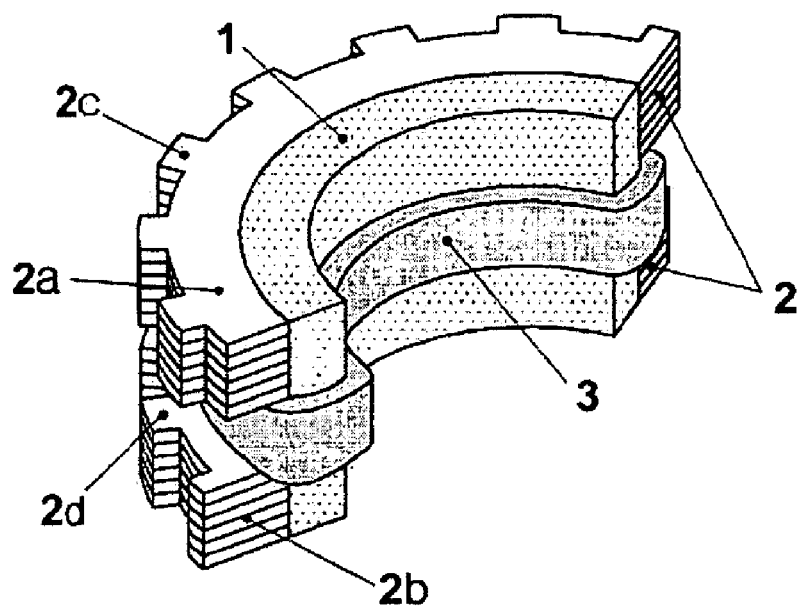
FIG. 2 is a partial perspective view illustrating a stator of the permanent magnet-excited transverse flux motor shown in FIG. 1.

In the meantime, FIG. 2 is a partial perspective view illustrating a stator of the permanent magnet-excited transverse flux motor shown in FIG. 1.

Referring to FIG. 2, a pair of stator laminated iron cores 2 are positioned respectively at an upper layer portion and a lower layer portion of an outer circumference of the stator powdered iron core 1 formed in a fan shape in such fashion as to be spaced apart from each other by a certain interval, and a stator winding is interposed between the upper layer portion and the lower layer portion in such fashion as to be wound around the stator powdered iron core 1 to form a multiple coil through which current flows.

Figure 3:
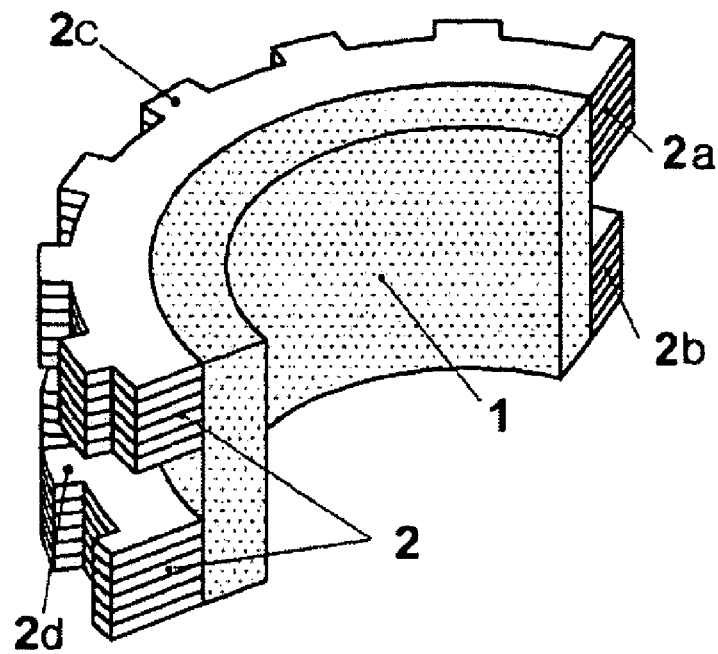
FIG. 3 is a partial perspective view illustrating an assembly of a stator powdered iron core and a pair of stator laminated iron cores of the permanent magnet-excited transverse flux motor except a stator winding shown in FIG. 2.

FIG. 3 is a partial perspective view illustrating an assembly of a stator powdered iron core and a pair of stator laminated iron cores of the permanent magnet-excited transverse flux motor except a stator winding shown in FIG. 2.

Referring to FIG. 3, the permanent magnet-excited transverse flux motor of the present invention is constructed such that since it must allow a three-dimensional flow of a magnetic flux, the stator powdered iron core 1 interconnects the upper and lower layer portions 2a and 2b of the stator laminated iron cores 2.

Meanwhile, a plurality of salients 2c and 2d are arranged protrudingly outwardly from the outer circumferences of the upper and lower stator laminated iron cores 2a and 2b at a uniform pole interval 2τ of a predetermined pitch. In this case, the salients 2c of the upper stator laminated iron cores 2a and the salients 2d of the lower stator laminated iron cores 2b are interlaced with one another at a uniform pole interval τ of a predetermined pitch so that a combined thrust force being created can be exerted toward one direction.

At this time, the stator laminated iron cores 2 take a laminated stack structure in a direction perpendicular to a direction in which a magnetic flux flows, i.e., in an axial direction thereof.

Figure 4:
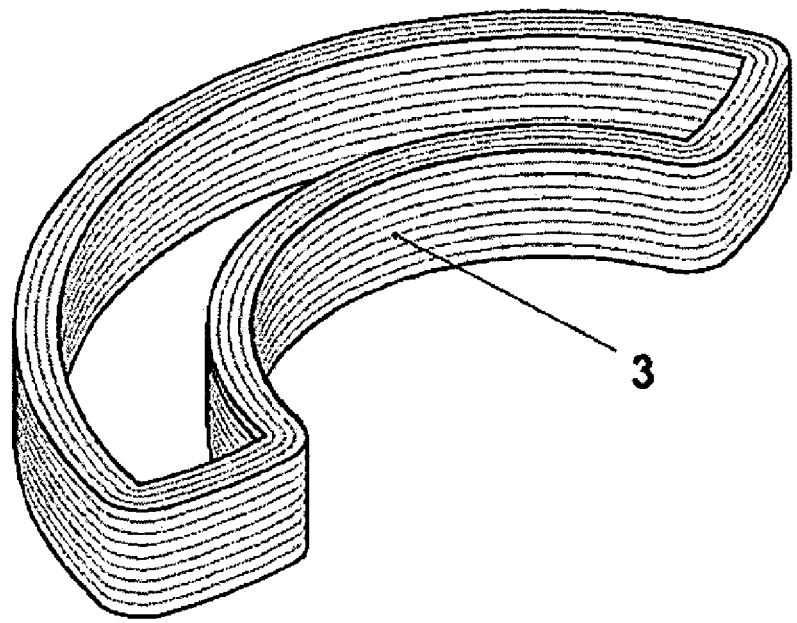
FIG. 4 is a perspective view illustrating a stator winding of the permanent magnet-excited transverse flux motor shown in FIG. 2.

FIG. 4 is a perspective view illustrating a stator winding of the permanent magnet-excited transverse flux motor shown in FIG. 2.

Referring to FIG. 4, the stator winding 3 is interposed between the upper and lower layer portions 2a and 2b constituting the stator laminated iron core 2 such that it is wound around the stator powdered iron core 1 in the form of a multiple coil through which current flows.

Figure 5:
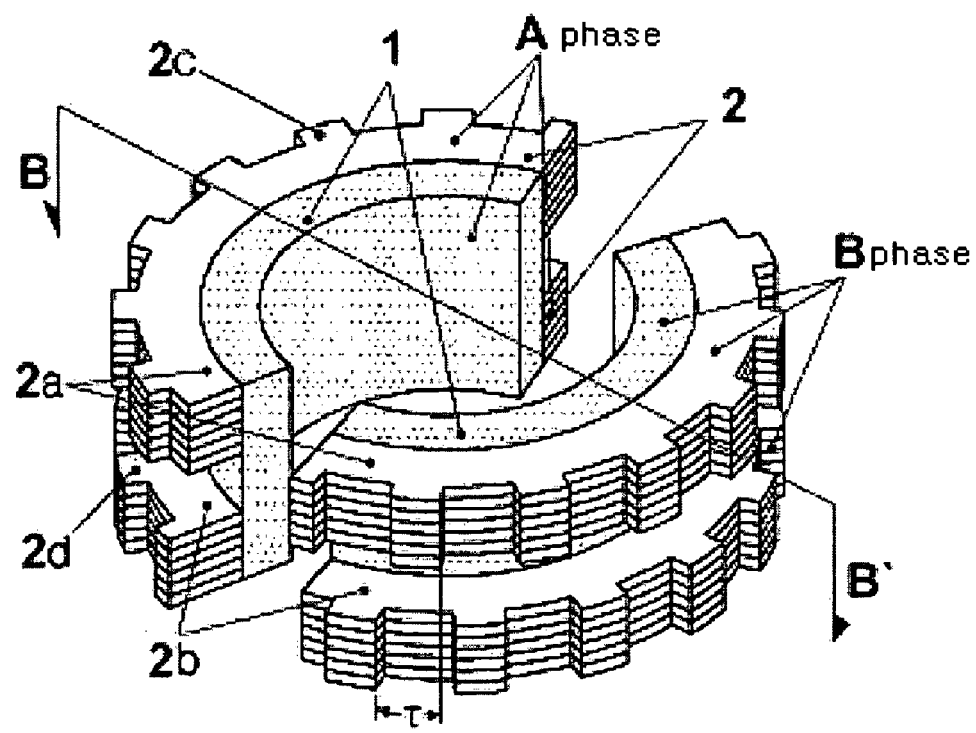
FIG. 5 is a perspective view illustrating a two-phase motor stator of a permanent magnet-excited transverse flux motor with an outer rotor according to the present invention.

As such, the stator powdered iron core 1 and the stator laminated iron core 2 of FIG. 3 and the stator winding 3 of FIG. 4 are mutually coupled to one another, to thereby form the stator 4 of FIG. 2. The stator 4 is formed to have a two-phase structure as shown in FIG. 5.

Figure 6:
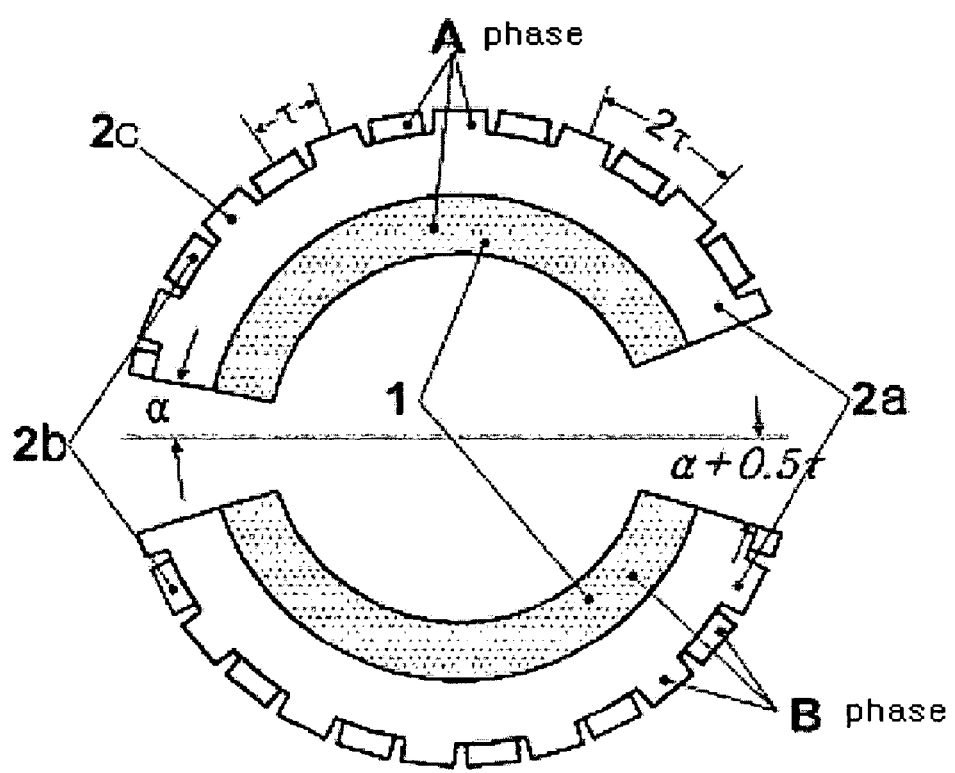
FIG. 6 is a top plan view illustrating the two-phase motor stator of the permanent magnet-excited transverse flux motor with an outer rotor according to the present invention.

FIG. 6 is a top plan view illustrating the two-phase motor stator of the permanent magnet-excited transverse flux motor with an outer rotor according to the present invention.

Referring to FIG. 6, a stator powdered iron core 1 and a stator laminated iron core 2 positioned above a central horizontal reference line indicated in FIG. 6 constitute an A-phase stator, and a stator powdered iron core 1 and a stator laminated iron core 2 positioned below the central horizontal reference line constitute a B-phase stator.

In this case, the structural position of the stator 4 formed in a two-phase structure is set such that a start position of the A-phase stator is offset by α clockwise from the central horizontal reference line, and a start position of the B-phase stator is offset by α+0.5τ clockwise from the central horizontal reference line. In such an air gap structure, the B-phase stator is more shifted by 0.5τ clockwise than A-phase stator based on the central horizontal reference line so as to obtain a stable property of less pulsation of a torque in a rotor.

Figure 7:
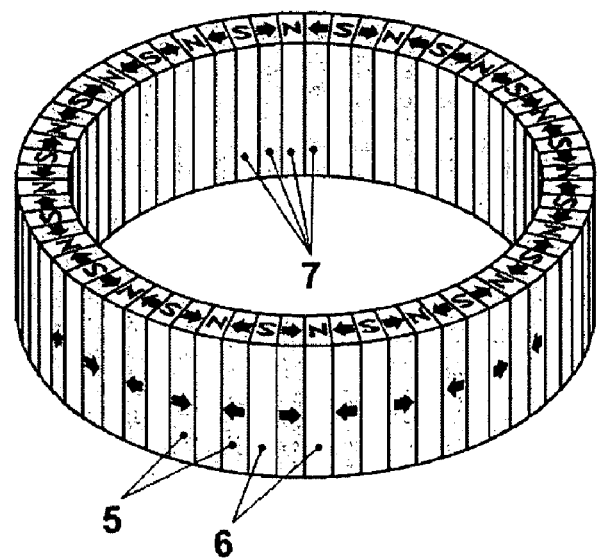
FIG. 7 is a perspective view illustrating a rotor of the permanent magnet-excited transverse flux motor shown in FIG. 1.

In the meantime, FIG. 7 is a perspective view illustrating a rotor of the permanent magnet-excited transverse flux motor shown in FIG. 1.

Referring to FIG. 7, the rotor 7 includes a plurality of rotor permanent magnets 5 and a plurality of rotor powdered iron cores 6 disposed on the outer circumference of the stator 4 in such a fashion as to be are alternately arranged adjacent to one another. In this case, the magnetic poles of two rotor permanent magnets 5 are arranged to face one another with a magnetic pole of a corresponding rotor powdered iron core 6 interposed therebetween so as to produce magnetic fluxes in different directions.

As such, in case where two adjacent rotor permanent magnets 5 are arranged alternately with a corresponding rotor powdered iron core 6 interposed therebetween, N- and S-magnetic poles are alternately generated in the rotor powdered iron cores 6 in the circumferential direction of the rotor 7.

In the meantime, arrows indicated in FIG. 7 denote the directions of magnetic fluxes generated from the rotor permanent magnets 5.

The rotor powdered iron cores 6 allows the magnetic flux of the rotor 7 to flow three-dimensionally similarly to the stator powdered iron core 1 of the stator 4.

Here, one cycle of the rotor permanent magnets 5 and the rotor powdered iron cores 6 is 2τ.

Figure 8:
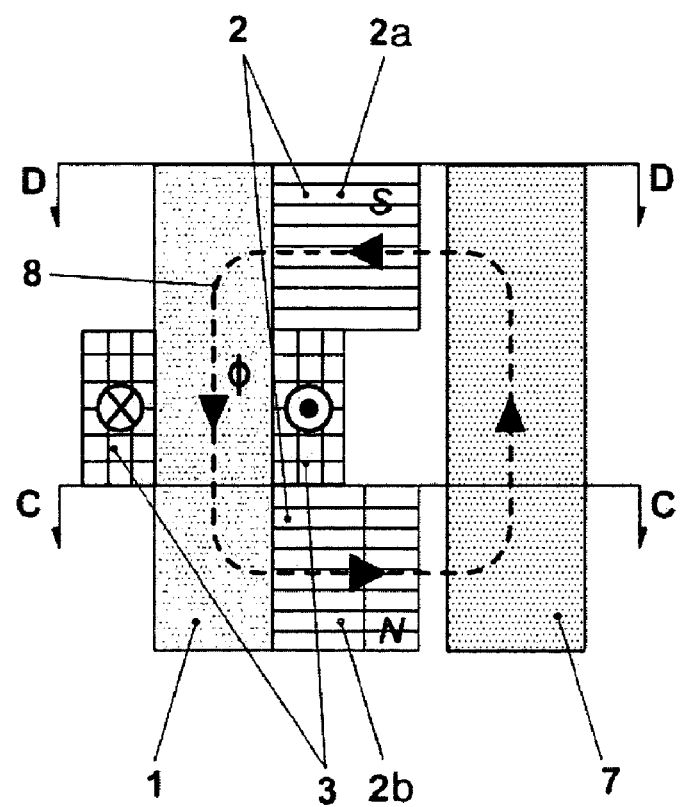
FIG. 8 is a vertical cross-sectional view taken along the line A-A' of FIG. 1.

FIG. 8 is a vertical cross-sectional view taken along the line A-A' of FIG. 1. In FIG. 8 there is shown the interaction relationship between the stator 4 composed of the stator powdered iron core 1, the stator laminated iron core 2 and the stator winding 3, the rotor 7, and a magnetic flux Φ 8 produced by the flow of current.

As shown in FIG. 8, when current (exiting the plane of the drawing vertically from below in case of a right or outer side stator winding, and entering the plane of the drawing vertically from above in case of a left or inner side stator winding) is applied to the stator winding 3, the flow of the magnetic flux Φ 8 is produced counterclockwise around the stator winding 3.

S- and N-poles are respectively formed in the upper and lower layer portions 2a and 2b of the stator laminated iron core 2 of the stator 4 of the permanent magnet-excited transverse flux motor with an outer rotor by means of the thus produced magnetic flux Φ 8.

Figure 9:
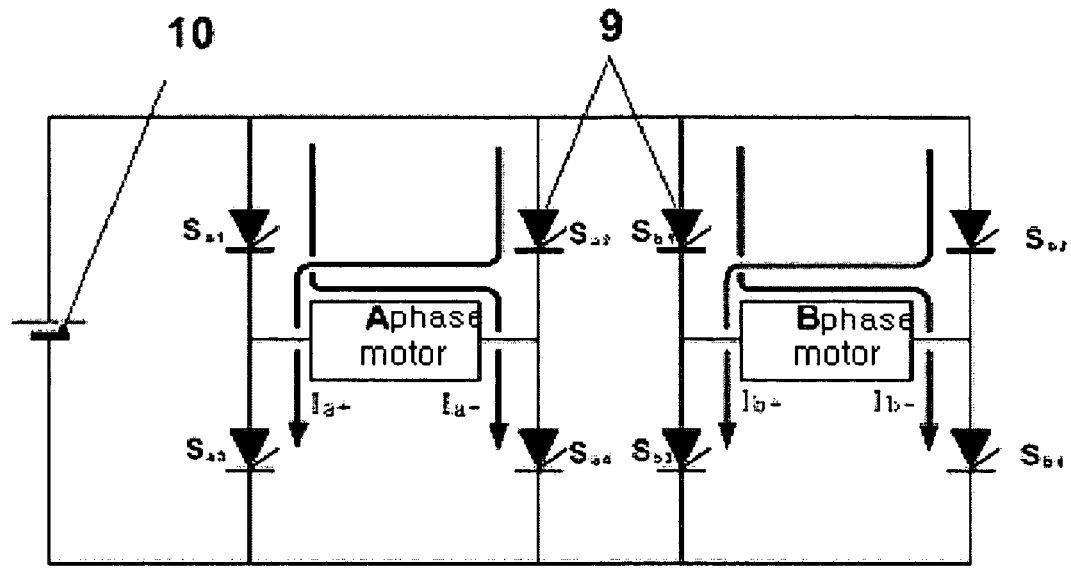
FIG. 9 is a circuitry diagram illustrating a power supply circuit of the permanent magnet-excited transverse flux motor with an outer rotor according to the present invention.

FIG. 9 is a circuitry diagram illustrating a power supply circuit of the permanent magnet-excited transverse flux motor with an outer rotor according to the present invention.

Referring to FIG. 9, the power supply circuit includes a semiconductor device 9 and a power supply 10.

The power supply 10 can be done by direct current (DC) power source or by converting alternating current (AC) power source into DC power source. A single-phase semiconductor device 9 is composed of four semiconductors $S_1$, $S_2$, $S_3$ and $S_4$ that are symmetrical to each of a pair of H-type circuits. In this case, one side H-type circuit is a circuit for an A-phase motor and the other side H-type circuit is a circuit for a B-phase motor.

In the circuit for the A-phase motor, the rotor requires a positive (+) or negative (−) current depending on its position in order to exert a thrust force in one direction. At this time, two semiconductors $S_2$ and $S_3$ are electrically conducted to allow the positive (+) current ($I_{a+}$ direction) to flow and two semiconductors $S_1$ and $S_4$ are electrically conducted to allow negative (−) current ($I_{a-}$ direction) to flow.

The circuit for the B-phase motor is operated in the same manner as that for the A-phase motor. In this case, since the B-phase stator is more shifted by 0.5τ clockwise than A-phase stator based on the central horizontal reference line in terms of a structural position, the semiconductor device 9 is operated with a phase delay by the time (cycle/4) corresponding to 0.5τ.

In the meantime, a force-generating principle of the permanent magnet-excited transverse flux motor with an outer rotor according to the present invention as constructed above will be described hereinafter with reference to FIGS. 10 to 13.

Figure 10:
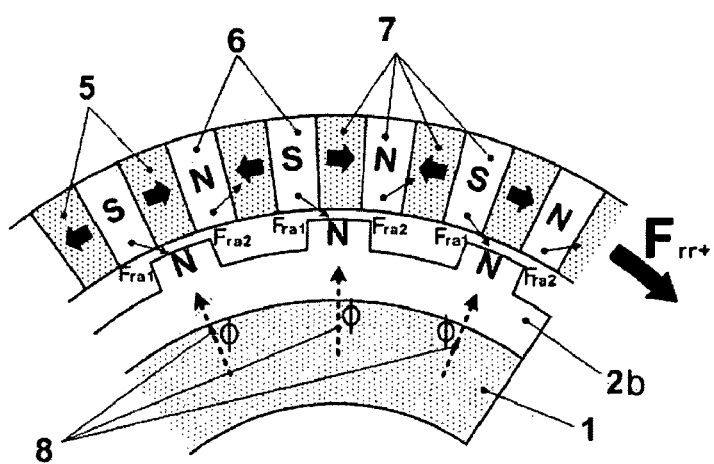
FIG. 10 is a schematic diagrammatic view illustrating a principle in which a force is generated with respect to the current direction $I_{a+}$ in a lower layer portion of the stator laminated iron core of the permanent magnet-excited transverse flux motor with an outer rotor according to the present invention.

FIG. 10 is a schematic diagrammatic view illustrating a principle in which a force is generated with respect to the current direction $I_{a+}$ in a lower layer portion 2b of the stator laminated iron core 2 and the rotor 7 of the permanent magnet-excited transverse flux motor with an outer rotor according to the present invention, which shows a cross-sectional view taken along the line C-C line of FIG. 8.

Referring back to FIG. 8, when current (exiting the plane of the drawing vertically from below in case of a right or outer side stator winding, and entering the plane of the drawing vertically from above in case of a left or inner side stator winding) is applied to the stator winding 3, the flow of the magnetic flux Φ 8 is produced counterclockwise around the stator winding 3 so that an S-pole is formed in the upper layer portion 2a of the stator laminated iron core 2 of the stator 4 and an N-pole is formed in the lower layer portion 2b of the stator laminated iron core 2 of the stator 4.

Meanwhile, when the rotor powdered iron core 6 is interposed between two opposed permanent magnets 5 having a magnetic flux direction of "→ ←", it forms an N-pole whereas when the rotor powdered iron core 6 is interposed between two opposed permanent magnets 5 having a magnetic flux direction of "← →", it forms an S-pole. Owing to the magnetic pole interaction between the N- and S-poles of the rotor 7 and the N-pole of the lower layer portion 2b of the stator laminated iron core 2, when the magnetic pole of the rotor 7 and the magnetic pole of the lower layer portion 2b are different from each other, an attractive force $F_{ra1}$ is generated, and when the magnetic pole of the rotor 7 and the magnetic pole of the lower layer portion 2b are identical to each other, a repulsive force $F_{ra2}$ is generated, thus generating a combined force $F_{rr+}$ from the rotor 7.

Figure 11:
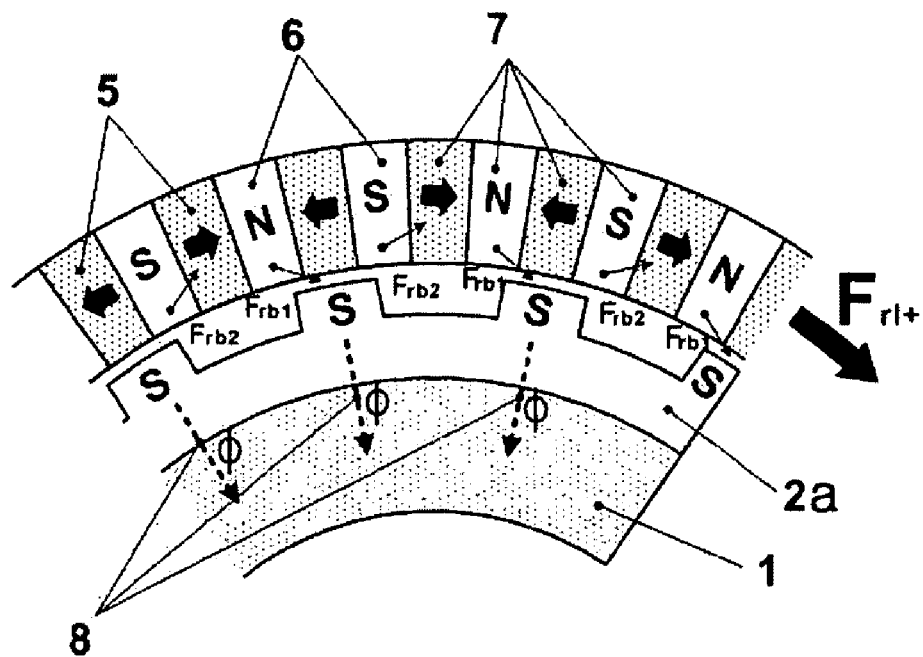
FIG. 11 is a schematic diagrammatic view illustrating a principle in which a force is generated with respect to the current direction $I_{a+}$ in an upper layer portion of the stator laminated iron core of the permanent magnet-excited transverse flux motor with an outer rotor according to the present invention.

FIG. 11 is a schematic diagrammatic view illustrating a principle in which a force is generated with respect to the current direction $I_{a+}$ in an upper layer portion of the stator laminated iron core and the rotor of the permanent magnet-excited transverse flux motor with an outer rotor according to the present invention, which shows a cross-sectional view taken along the line D-D line of FIG. 8.

Referring back to FIG. 8, when current (exiting the plane of the drawing vertically from below in case of a right or outer side stator winding, and entering the plane of the drawing vertically from above in case of a left or inner side stator winding) is applied to the stator winding 3, the flow of the magnetic flux Φ 8 is produced counterclockwise around the stator winding 3 so that an S-pole is formed in the upper layer portion 2a of the stator laminated iron core 2 of the stator 4 and an N-pole is formed in the lower layer portion 2b of the stator laminated iron core 2 of the stator 4.

Similarly, Owing to the magnetic pole interaction between the N- and S-poles of the rotor 7 and the S-pole of, the upper layer portion 2a of the stator laminated iron core 2, when the magnetic pole of the rotor 7 and the magnetic pole of the upper layer portion 2a are different from each other, an attractive force $F_{rb1}$ is generated, and when the magnetic pole of the rotor 7 and the magnetic pole of the upper layer portion 2a are identical to each other, a repulsive force $F_{ra2}$ is generated, thus generating a combined force $F_{r1+}$ from the rotor 7.

Since the upper and lower layer portions 2a and 2b of the stator laminated iron core 2 are arranged offset by τ from each other, the rotor 7 always produces a combined thrust force in one tangential direction.

Figure 12:
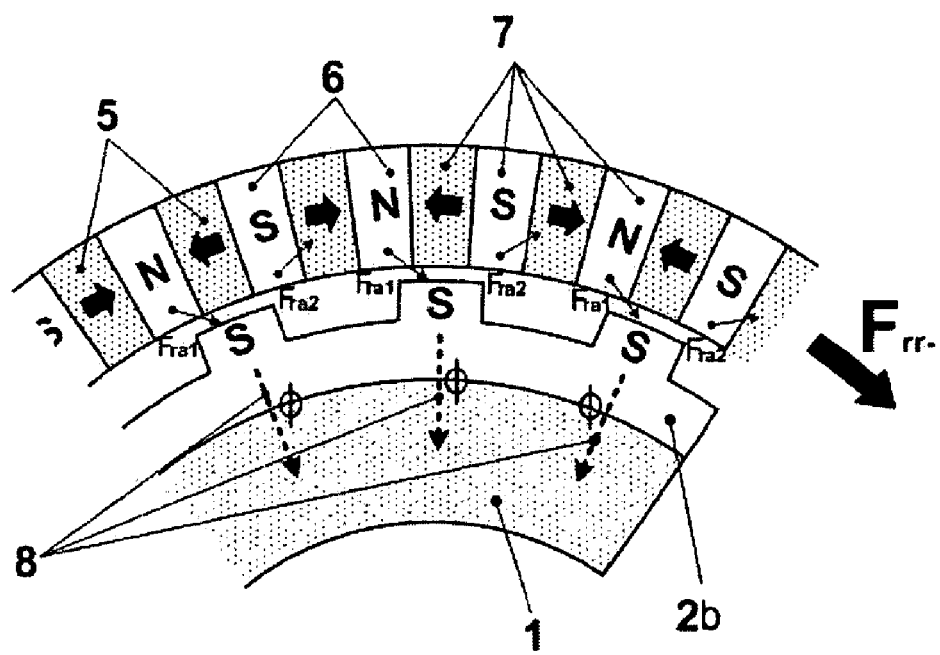
FIG. 12 is a schematic diagrammatic view illustrating a principle in which a force is generated with respect to the current direction $I_{a-}$ in a lower layer portion of the stator laminated iron core of the permanent magnet-excited transverse flux motor with an outer rotor according to the present invention.

FIG. 12 is a schematic diagrammatic view illustrating a principle in which a force is generated with respect to the negative current direction $I_{a-}$ in a lower layer portion 2b of the stator laminated iron core 2 and the rotor 7 of the permanent magnet-excited transverse flux motor with an outer rotor according to the present invention, which is the same as FIG. 10 in terms of the force-generating principle.

The force-generating principle of FIG. 12 is different from that of FIG. 10 in that the rotor 7 is more shifted by τ clockwise than that in FIG. 10 and the directions of current flowing in the stator winding 3 in FIGS. 10 and 12 are opposite to each other.

Dissimilarly to FIG. 8, when current $I_{a-}$ (entering the plane of the drawing vertically from above in case of a right or outer side stator winding, and exiting the plane of the drawing vertically from below in case of a left or inner side stator winding) is applied to the stator winding 3, the flow of the magnetic flux Φ 8 is produced clockwise around the stator winding 3 so that an N-pole is formed in the upper layer portion 2a of the stator laminated iron core 2 of the stator 4 and an S-pole is formed in the lower layer portion 2b of the stator laminated iron core 2 of the stator 4. Owing to the magnetic pole interaction between the N- and S-poles of the rotor 7 more shifted by τ clockwise and the S-pole of the lower layer portion 2b of the stator laminated iron core 2, when the magnetic pole of the rotor 7 and the magnetic pole of the lower layer portion 2b are different from each other, an attractive force $F_{ra1}$ is generated, and when the magnetic pole of the rotor 7 and the magnetic pole of the lower layer portion 2b are identical to each other, a repulsive force $F_{ra2}$ is generated, thus generating a combined force $F_{rr-}$ from the rotor 7.

Figure 13:
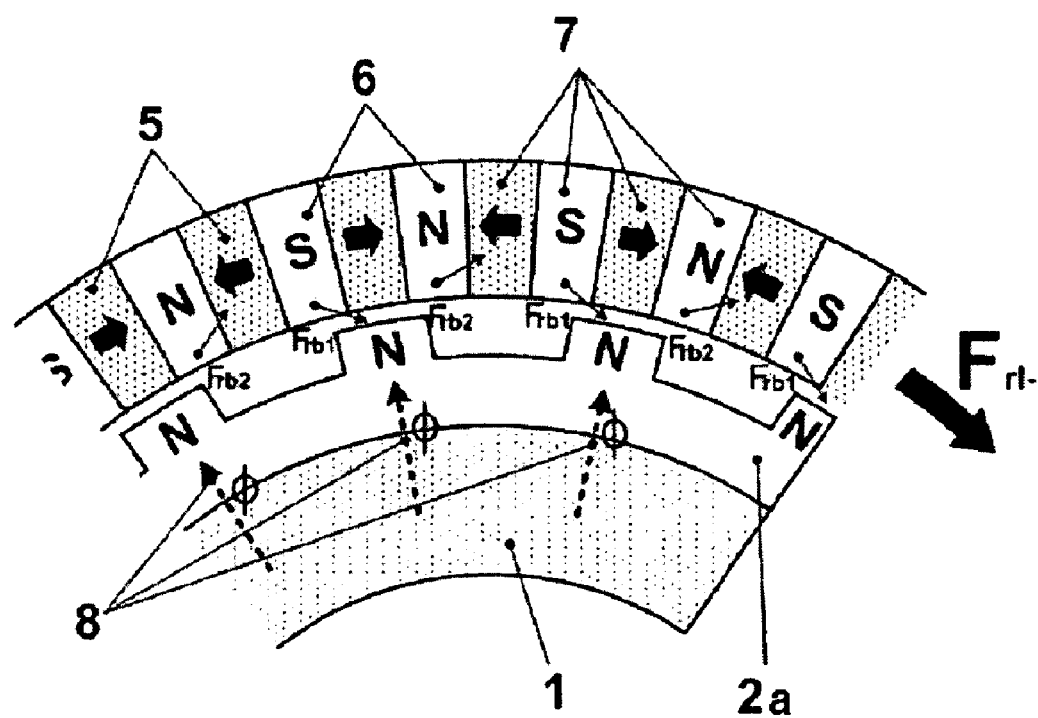
FIG. 13 is a schematic diagrammatic view illustrating a principle in which a force is generated with respect to the current direction $I_{a-}$ in an upper layer portion of the stator laminated iron core of the permanent magnet-excited transverse flux motor with an outer rotor according to the present invention.

FIG. 13 is a schematic diagrammatic view illustrating a principle in which a force is generated with respect to the negative current direction $I_{a-}$ in an upper layer portion 2a of the stator laminated iron core of the permanent magnet-excited transverse flux motor with an outer rotor according to the present invention, which is the same as FIG. 11 in terms of the force-generating principle.

The force-generating principle of FIG. 13 is different from that of FIG. 11 in that the rotor 7 is more shifted by τ clockwise than that in FIG. 11 and the directions of current flowing in the stator winding 3 in FIGS. 13 and 11 are opposite to each other.

Dissimilarly to FIG. 8, when current $I_{a-}$ (entering the plane of the drawing vertically from above in case of a right or outer side stator winding, and exiting the plane of the drawing vertically from below in case of a left or inner side stator winding) is applied to the stator winding 3, the flow of the magnetic flux Φ 8 is produced clockwise around the stator winding 3 so that an N-pole is formed in the upper layer portion 2a of the stator laminated iron core 2 of the stator 4 and an S-pole is formed in the lower layer portion 2b of the stator laminated iron core 2 of the stator 4. Owing to the magnetic pole interaction between the N- and S-poles of the rotor 7 more shifted by τ clockwise and the S-pole of the lower layer portion 2b of the stator laminated iron core 2, when the magnetic pole of the rotor 7 and the magnetic pole of the lower layer portion 2b are different from each other, an attractive force $F_{rb1}$ is generated, and when the magnetic pole of the rotor 7 and the magnetic pole of the lower layer portion 2b are identical to each other, a repulsive force $F_{rb2}$ is generated, thus generating a combined force $F_{r1-}$ from the rotor 7.

Figure 14:
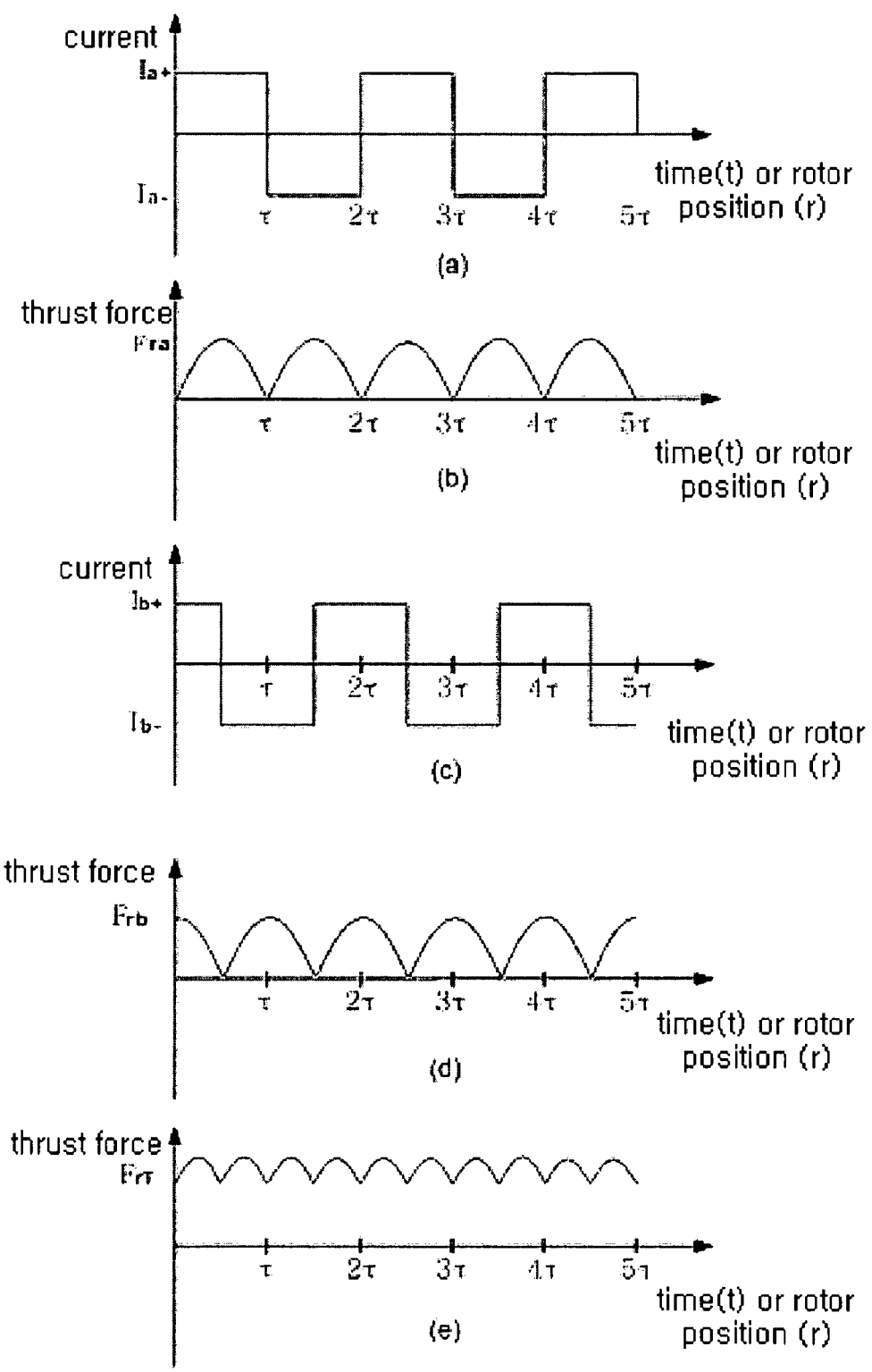
FIG. 14 is a graph illustrating the characteristic relationships between current and a rotor position, and between a thrust force and the rotor position of the two-phase motor according to the present invention.

FIG. 14 is a graph illustrating the characteristic relationships between current and a rotor position, and between a thrust force and the rotor position of the two-phase motor according to the present invention. In FIG. 14, the thrust force indicates a thrust force which is generated from the rotor 7 by means of a pair of single-phase stators (i.e., A-phase and B-phase stators) the stator 4 depending on the position of the rotor, and the installation of the A-phase stator and B-phase stator can reduce the pulsation in the thrust force to thereby obtain a stable property.

That is, in order to generate a force in one direction, the direction of the excited current must be changed depending on the position of the rotor 7. In FIG. 14(a), the A-phase stator is applied with a positive excited current $I_{a+}$ at the time intervals, i.e., the rotor positions of 0 to τ, 2τ to 3τ, and 4τ to 5τ, and is applied with a negative excited current $I_{a-}$ at the time intervals, i.e., the rotor positions of τ to 2τ, and 3τ to 4τ.

In the meantime, FIG. 14(b) shows the waveform characteristic between the position of an A-phase rotor and the thrust force thereof, wherein the waveform is a sine waveform. In this case, the magnetic pole position of the rotor 7 at τ, 2τ, 3τ, 4τ and 5τ at which the period of current varies, and the magnetic pole position of the stator 4 are formed in a vertical direction with an air gap defined therebetween, and thus does not generate a thrust force from the rotor 7.

There is a positional shift of 0.5τ between the A-phase stator and the B-phase stator based on the central horizontal reference line in terms of their structural positions.

Thus, the waveform of a B-phase time (t) or a rotor position (r) versus current ($I_{b+}$, $I_{b-}$) in FIG. 14(c) is more phase-shifted by 0.5τ than the waveform of a A-phase time (t) or a rotor position (r) versus current ($I_{a+}$, $I_{a-}$) in FIG. 14(a). The B-phase stator is applied with a positive excited current $I_{b+}$, at the time intervals, i.e., the rotor positions of 0 to (1/2)τ, (3/2)τ to (5/2)τ, and (7/2)τ to (9/2)τ, and is applied with a negative excited current $I_{b-}$, at the time intervals, i.e., the rotor positions of (1/2)τ to (3/2)τ, and (5/2)τ to (7/2)τ. As a result, the waveform between a B-phase time (t) or a rotor position (r) and a thrust force in FIG. 14(d) is more phase-shifted by 0.5τ than the waveform between an A-phase time (t) or a rotor position (r) and a thrust force ($F_{ra}$) in FIG. 14(b).

In addition, FIG. 14(e) shows the waveform characteristic of a two-phase combined thrust force ($F_{rT}$) by time (t) or a rotor position (r) and, wherein the thrust force ($F_{rT}$) has a minimum value at 0, $(1/2)\tau, \tau, (3/2)\tau, 2\tau, \ldots$, and a maximum value at $(1/4)\tau, (3/4)\tau, (5/4)\tau, \ldots$.

Figure 15:
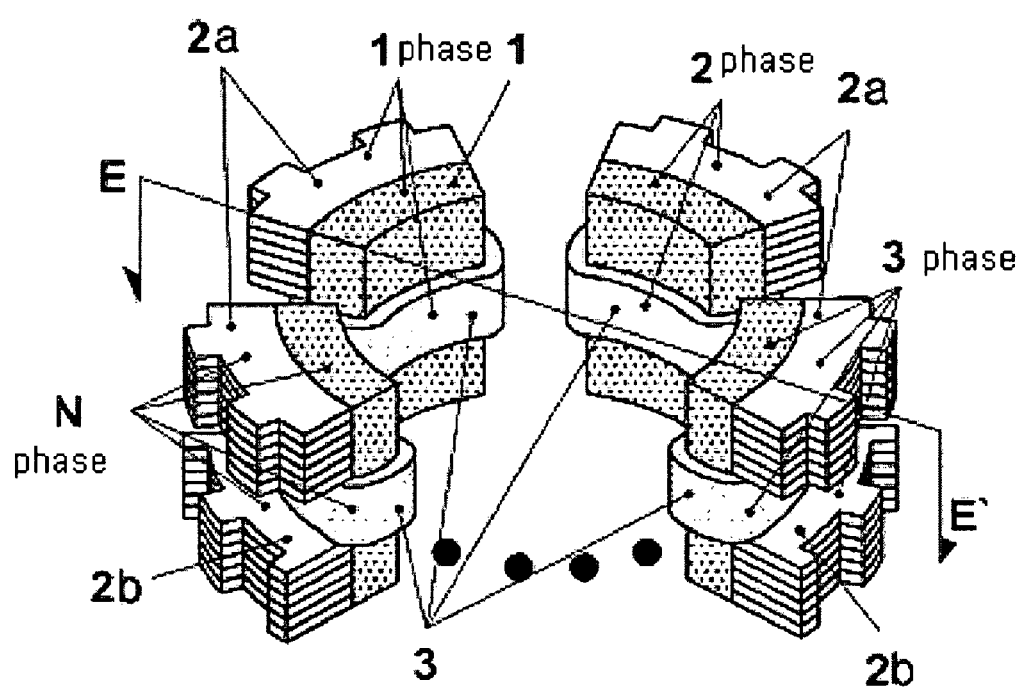
FIG. 15 is a partial perspective view illustrating a multi-phase motor stator whose phase is more than 2 in the permanent magnet-excited transverse flux motor with an outer rotor according to the present invention.

FIG. 15 is a partial perspective view illustrating a multi-phase motor stator whose phase is more than 2 in the permanent magnet-excited transverse flux motor with an outer rotor according to the present invention.

Each phase stator is composed of a stator powdered iron core 1, upper and lower layer portions 2a and 2b of a stator laminated iron core 2 and a stator winding 3 wound around the stator powdered iron core 1, as shown in FIG. 2. In a multi-phase structure of FIG. 15, a second phase stator, a third phase stator, . . . , N$^{-th}$ phase stator are sequentially circumferentially arranged clockwise with respect to a first phase stator, each phase stator being formed in a fan shape in horizontal cross-section.

Figure 16:
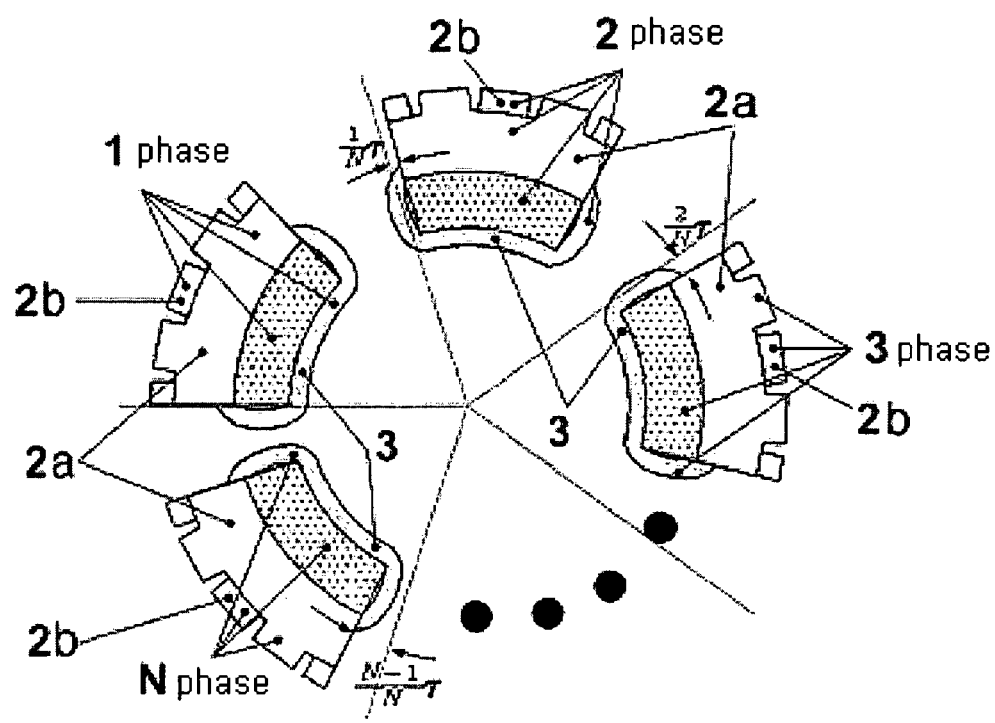
FIG. 16 is a top plan view illustrating a multi-phase motor stator whose phase is more than 2 in the permanent magnet-excited transverse flux motor with an outer rotor according to the present invention.

FIG. 16 is a top plan view of FIG. 15.

Referring to FIG. 16, each phase stator includes the stator powdered iron core 1, the upper and lower layer portions 2a and 2b of the stator laminated iron core 2 and the stator winding 3 wound around the stator powdered iron core 1.

As shown in FIG. 16, the second phase stator is more shifted by $$\frac{1}{N}\tau$$

clockwise than the first phase stator based on a reference line so as to attenuate the thrust pulsation, and the third phase stator is more shifted by $$\frac{2}{N}\tau$$

clockwise than the first phase stator based on a reference line. Thus, N$^{-th}$ phase stator is more shifted by $$\frac{N-1}{N}\tau$$

clockwise than the first phase stator based on a reference line.

Figure 17:
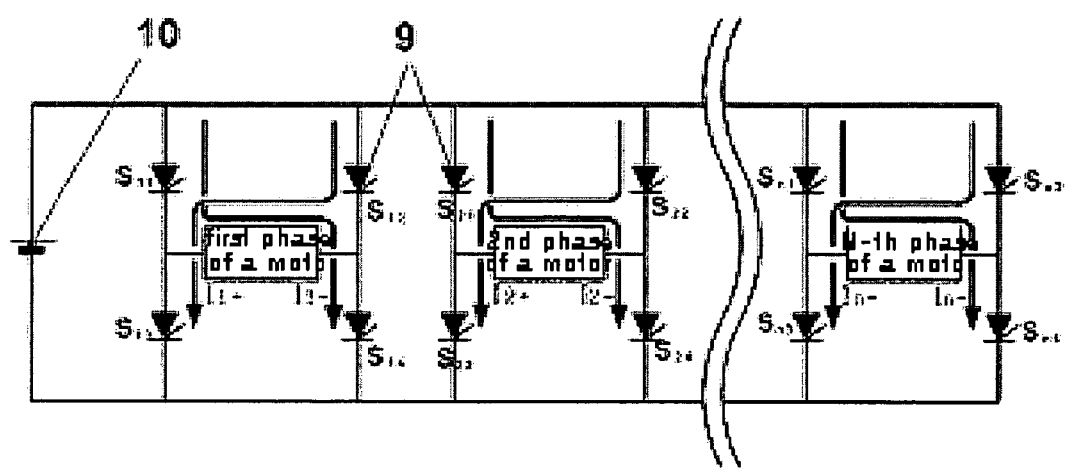
FIG. 17 is a circuitry diagram illustrating a power supply circuit of the multi-phase permanent magnet-excited transverse flux motor with an outer rotor according to the present invention.

FIG. 17 is a circuitry diagram illustrating a power supply circuit of the multi-phase permanent magnet-excited transverse flux motor with an outer rotor according to the present invention.

Referring to FIG. 17, the power supply circuit includes a semiconductor device 9 and a power supply 10.

The power supply 10 can be done by direct current (DC) power source or by converting alternating current (AC) power source into DC power source. A semiconductor device 9 for each phase is composed of four semiconductors devices $S_1$, $S_2$, $S_3$ and $S_4$ that are symmetrical to each of N H-type circuits. In this case, a first H-type circuit positioned at the leftmost side of the power supply circuit is a circuit for a first phase motor, a second H-type circuit is a circuit for a second phase motor, and an N$^{-th}$ H-type circuit positioned at the rightmost side of the power supply circuit is a circuit for an N$^{-th}$ phase motor.

In the first H-type circuit for the first phase motor, the rotor requires a positive (+) or negative (−) current depending on its position in order to exert a thrust force in one direction. At this time, two semiconductors devices $S_{12}$ and $S_{13}$ are electrically conducted to allow the positive (+) current ($I_{1+}$ direction) to flow and two semiconductors $S_{11}$ and $S_{14}$ are electrically conducted to allow negative (−) current ($I_{1-}$ direction) to flow.

The second H-type circuit for the second phase motor is operated in the same manner as the first H-type circuit. In this case, since the second phase stator is more shifted by $$\frac{1}{N}\tau$$

clockwise than the first phase stator based on a reference line, the semiconductor device 9 is operated with a phase delay $$\left(\frac{\text{period}}{2N}\right)$$

as much as the time corresponding to $$\frac{1}{N}\tau.$$

Similarly, the N$^{-th}$ H-type circuit for the N$^{-th}$ phase motor is operated in the same manner as the first H-type circuit. Thus, since the N$^{-th}$ phase stator is more shifted by $$\frac{N-1}{N}\tau$$

clockwise than the first single-phase stator based on a reference line, the semiconductor device 9 is operated with a phase delay $$\left(\frac{(N-1)\text{period}}{2N}\right)$$

as the time corresponding to $$\frac{N-1}{N}\tau.$$

Figure 18:
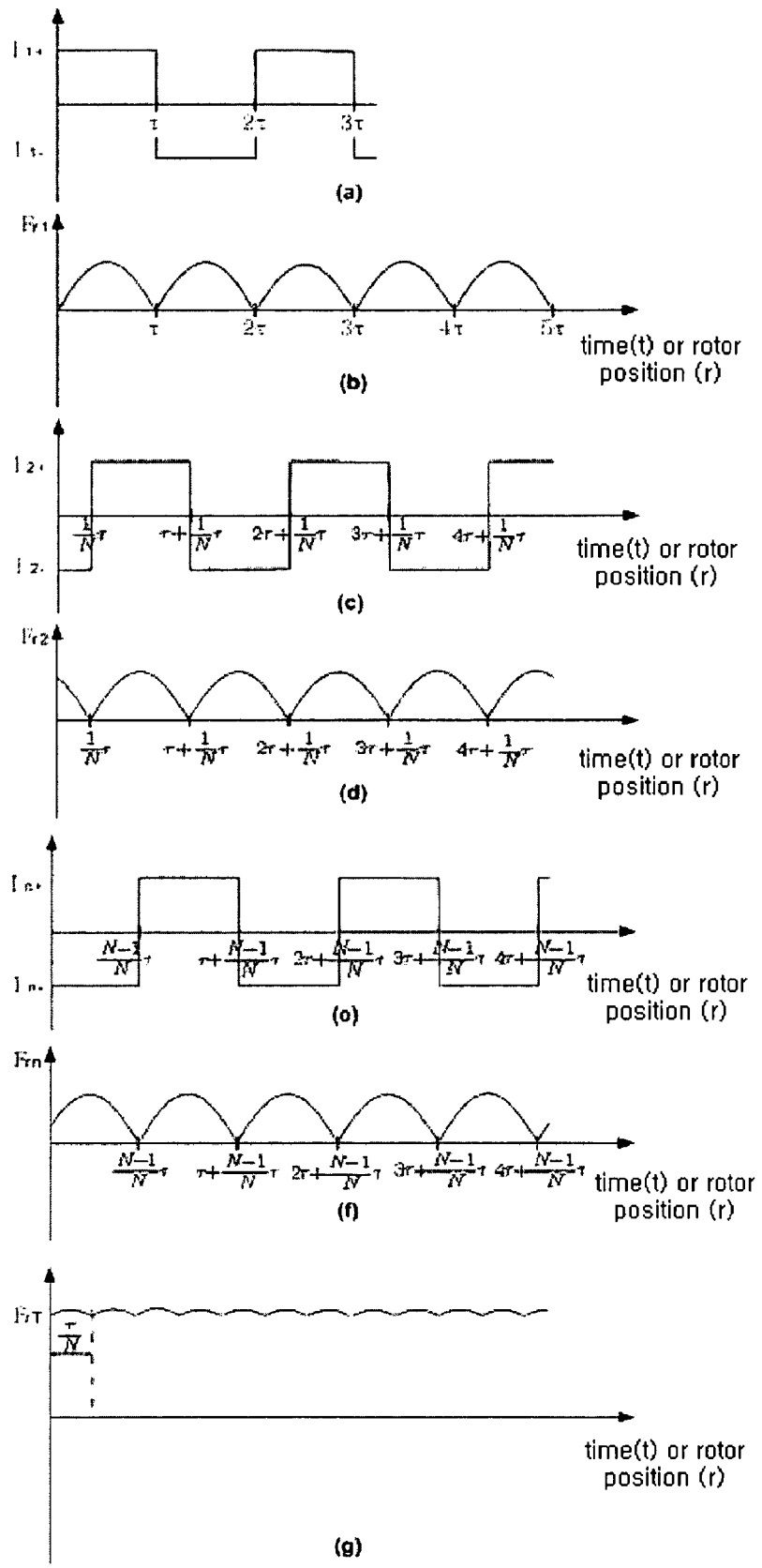
FIG. 18 is a graph illustrating the characteristic relationships between current and a rotor position, and between a thrust force and the rotor position of the multi-phase motor according to the present invention.

FIG. 18 is a graph illustrating the characteristic relationships between current and a rotor position, and between a thrust force and the rotor position of the multi-phase motor according to the present invention. In FIG. 18, the installation of N phase stators (first, second, . . . , N$^{-th}$ phase stators) can reduce the pulsation in the thrust force to thereby obtain a stable property. As shown in FIG. 16, the stator formed to have the respective single-phases is set in its structural position such that as the number of a corresponding single-phase stator is incremented by 1 based on the first phase stator used as a reference phase stator, the corresponding single-phase stator whose number is incremented is more shifted by $$\frac{1}{N}\tau$$

clockwise than the first phase stator based on a reference line, and the N$^{-th}$ phase stator is more shifted by $$\frac{N-1}{N}\tau$$

clockwise than the first phase stator based on a reference line.

Thus, the waveform between a second phase time (t) or a rotor position (r) and a current ($I_{2+}$, $I_{2-}$) in FIG. 18(c) is more phase-shifted by $$\frac{1}{N}\tau$$

than the waveform between a first phase time (t) or a rotor position (r) and current ($I_{1+}$, $I_{1-}$) in FIG. 18(a). As a result, the waveform between an N$^{-th}$ phase time (t) or a rotor position (r) and a current ($I_{n+}$, $I_{n-}$) in FIG. 18(e) is more phase-shifted by $$\frac{N-1}{N}\tau$$

than the waveform between the first phase time (t) or a rotor position (r) and current ($I_{1+}$, $I_{1-}$) in FIG. 18(a).

The period of current of the respective single-phases is 2τ. The waveform of an excited current for the first phase stator to be supplied depending on the position of the rotor 7

That is, in order to generate a thrust force from the rotor in one direction, the direction of the excited current to be supplied to the first phase stator must be changed depending on the position of the rotor 7. In FIG. 18(a), the first phase stator is applied with a positive excited current $I_{1+}$ at the time intervals, i.e., the rotor positions of 0 to τ, 2τ to 3τ, and 4τ to 5τ, and is applied with a negative excited current $I_{a-}$ at the time intervals, i.e., the rotor positions of τ to 2τ, and 3τ to 4τ.

The waveform characteristic between each single-phase time (t) or a rotor position (r) and a thrust force always has a positive value due to the current waveform, and as the number of a corresponding single-phase stator is incremented by 1 based on the first phase stator, the corresponding single-phase stator whose number is incremented is more shifted by $$\frac{1}{N}\tau$$

than the first phase stator.

The waveform characteristic between each single-phase time (t) or a rotor position (r) and a combined thrust force ($F_{rT}$) of N$^{-th}$ phase rotor has a uniform period. In this case, as the number of the single-phase stators increases, the thrust pulsation is attenuated.

Figure 19:
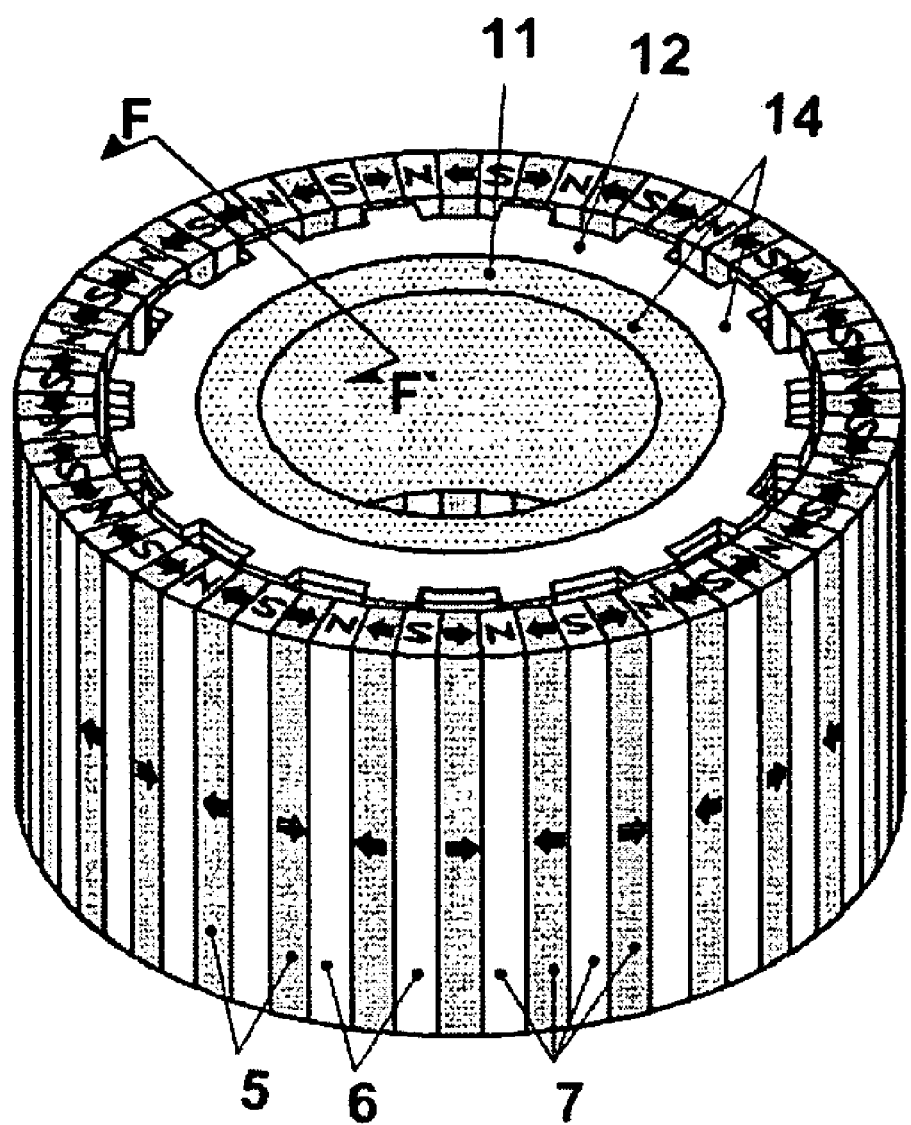
FIG. 19 is a perspective view illustrating the construction of a permanent magnet-excited transverse flux motor with an outer rotor including an annular stator according to the present invention.

FIG. 19 is a perspective view illustrating the construction of a permanent magnet-excited transverse flux motor with an outer rotor including an annular stator according to the present invention.

Referring to FIG. 19, the permanent magnet-excited transverse flux motor includes: an annular stator 14 consisting of an annular stator powdered iron core 11, an annular stator laminated iron core 12 and an annular stator winding 13; and a rotor 7 consisting of rotor permanent magnets 5 and rotor powdered iron cores 6.

The permanent magnet-excited transverse flux motor of FIG. 19 is different from that of FIG. 1 in that the annular stator 14 replaces the fan-shaped stator 4.

Such an annular stator 14 entails a merit in that an attractive force and a repulsive force exerted to the rotor 7 is symmetrical to each other spatially about a central axis thereof.

As such, the stator winding 13 of the permanent magnet-excited transverse flux motor including the stator 14 formed in an annular shape surrounds the outer circumference of the annular stator powdered iron core 11, and hence the stator winding 13 is easy to be wound around the annular stator powdered iron core 11 and the amount of the material (copper) is less consumed.

In the meantime, the annular stator 14 has N annular stators 14 arranged to be stacked one top of one another in the direction of a rotary axis of the rotor 7 so as to reduce the pulsation of the thrust. In this case, the length of the rotor 7 is determined depending on the number of the annular-shaped stators 14.

The annular stator 14 and the rotor 7 have an air gap a defined therebetween so as to induce a repulsive force and an attractive force between the annular stator 14 and the rotor 7.

Figure 20:
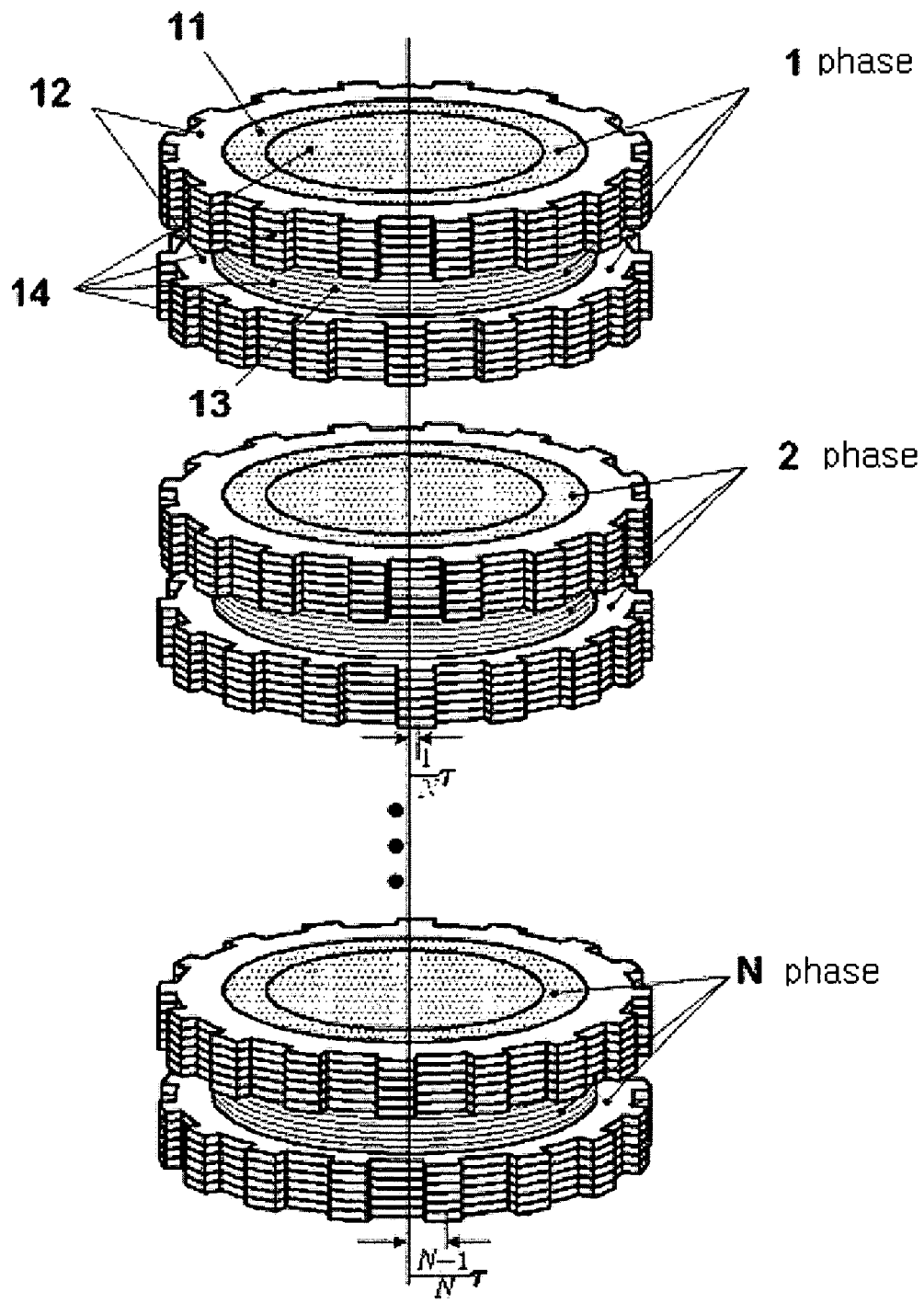
FIG. 20 is a perspective view illustrating N single-phase annular stators of the permanent magnet-excited transverse flux motor with an outer rotor according to the present invention.

FIG. 20 is a perspective view illustrating N single-phase annular stators (first to N$^{-th}$ phase annular stators of the permanent magnet-excited transverse flux motor with an outer rotor according to the present invention.

Referring to FIG. 20, an annular stator powdered iron core 1, upper and lower layer portions 12a and 12b of an annular stator laminated iron core 12, and an annular stator winding 13 constitutes one annular stator 14. The uppermost annular stator is a first phase stator, the second annular stator to the uppermost annular stator is a second phase stator, and the lowermost annular stator is a N$^{-th}$ phase stator.

In this case, the second phase annular stator is more rotated clockwise by $$\frac{1}{N}\tau$$

than the first phase stator based on a reference line, and N$^{-th}$ phase annular stator is more shifted clockwise by $$\frac{N-1}{N}\tau$$

than the first single-phase stator based on a reference line.

Such an annular stator can reduce pulsation of a torque of the rotor.

Figure 21:
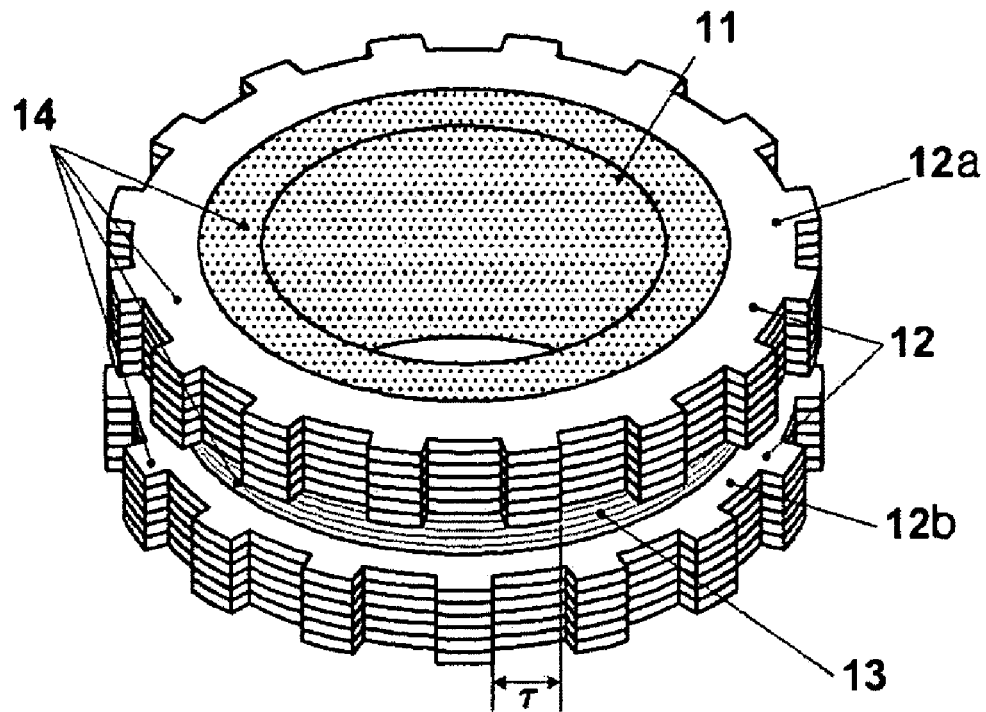
FIG. 21 is a perspective view illustrating a single-phase annular stators of FIG. 20.

FIG. 21 is a perspective view illustrating a single-phase annular stator of FIG. 20.

Referring to FIG. 21, the single-phase annular stator 14 includes an annular stator powdered iron core 11, an annular stator laminated iron core 12 and an annular stator winding 13. An upper layer portion 12a and a lower layer portion 12b of the annular stator laminated iron core 12 are arranged offset by τ from each other so as to produce a combined thrust force from the rotor 7 in one tangential direction.

At this time, the annular stator laminated iron core 12 takes a lamination structure in the direction perpendicular to the direction where a magnetic flux flows, i.e., in its axial direction so as to decrease the amount of core loss.

The annular stator 14 also includes a power supply circuit as shown in FIG. 17 so as to be supplied with electric power. The annular stator 14 has the waveform characteristic between current and a rotor position, and between a thrust force and the rotor position of the multi-phase motor according to the present invention as shown in FIG. 18.

When current flows in the annular stator winding 13 of the first single-phase annular stator in a clockwise direction, a cross-sectional view taken along the line F-F of FIG. 19 is the same as FIG. 8.

The annular stator winding 3 is the same as the case where a right or outer side stator winding where current exits the plane of the drawing vertically from below is excluded from the stator winding 3 of FIG. 8.

The principle of generating a force exerted to the upper and lower layer portions 12a and 12b of the stator laminated iron core 12 is the same as that in FIGS. 10 and 11 when current flows clockwise in the annular stator winding 13, and is the same as that in FIGS. 12 and 13 when current flows counterclockwise in the annular stator winding 13.

Figure 22:
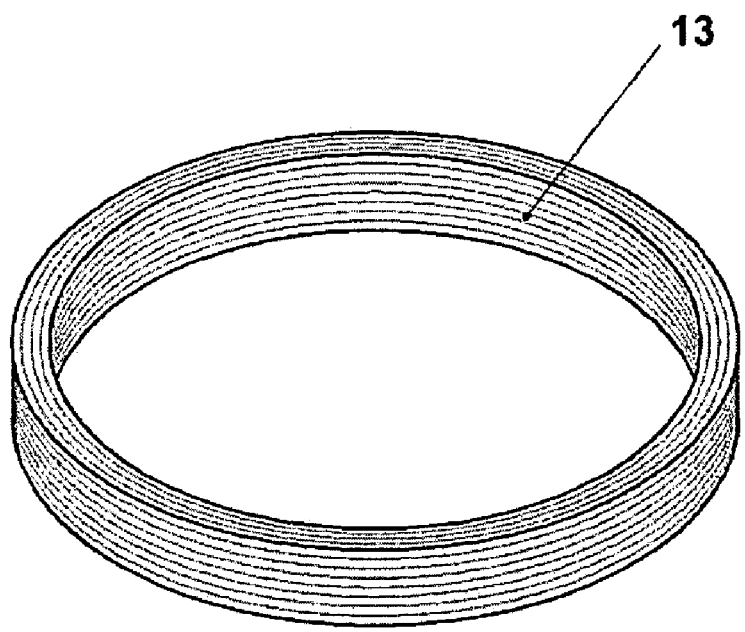
FIG. 22 is a perspective view illustrating an annular stator winding of the annular stator of FIG. 21.

FIG. 22 is a perspective view illustrating an annular stator winding through which current flows in the annular stator of FIG. 21.

Referring to FIG. 22, coils are wound around the annular stator powdered iron core 11 between the upper and lower layer portions 12a and 12b of the annular stator laminated iron core 12 to thereby form a multiple coil through which current flows.

Figure 23:
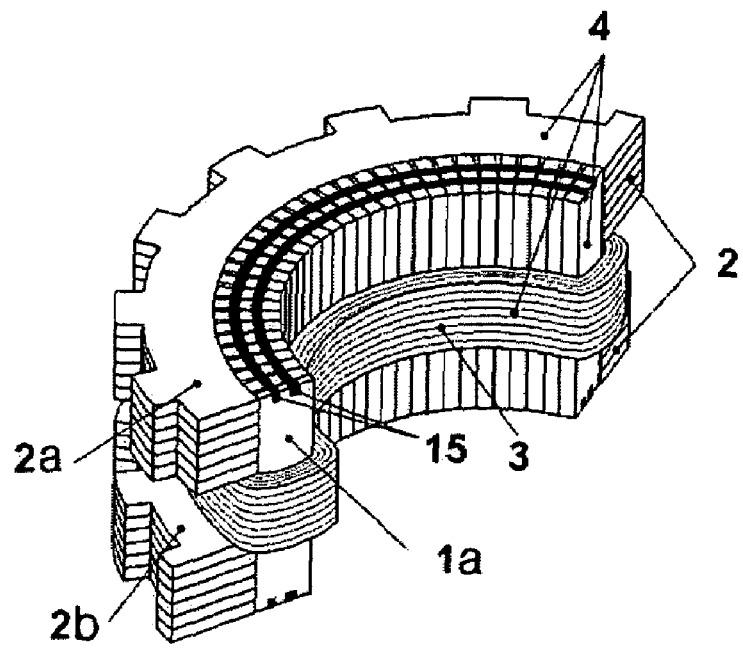
FIG. 23 is a perspective view illustrating a stator having radial iron cores of the permanent magnet-excited transverse flux motor with an outer rotor according to the present invention.

FIG. 23 is a perspective view illustrating a stator having radial iron cores of the permanent magnet-excited transverse flux motor with an outer rotor according to the present invention.

In FIG. 23, the stator powdered iron core 1 of the stator 4 in FIG. 2 is replaced with radial iron cores 1a of a laminated structure composed of a plurality of rectangular parallelepipeds. Such the radial iron core 1a of the laminated structure can a relatively greatly reduce the amount of eddy current loss as compared to the stator powdered iron core 1.

In order for small radial iron cores 1a of a plurality of rectangular parallelepipeds to be formed in a fan shape, fixing pins 15 for fixing a number of radial iron cores 1a are required. At this time, small air gaps are defined at the contact boundary surface between the radial iron core 1a and the stator laminated iron core 2.

Figure 24:
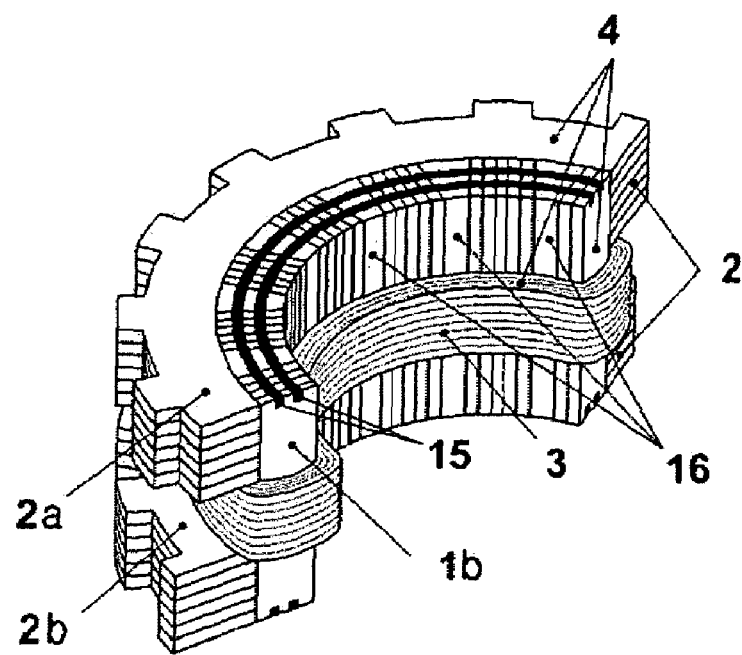
FIG. 24 is a perspective view illustrating a stator having radial iron cores and spaces of the permanent magnet-excited transverse flux motor with an outer rotor according to the present invention.

In the meantime, since it is difficult to equidistantly maintain the rectangular parallelepipeds of the radial iron core 1a, as shown in FIG. 24, a technology is implemented in which the radial iron core 1a is fabricated in a module unit. In FIG. 24, the radial iron core pieces 1a are arranged equidistantly in a module unit in the stator 4 of FIG. 2 according to the present invention, and a space 16 made of a non-magnetic material is interposed between one module and another adjacent module in a circumferential direction of the radial iron core at uniform intervals, thus implementing a radial iron core 1b which is easy to manufacture and process.

In this case, the spacer 16 is constructed such that it is molded between respective modules of the radial iron core 1b so as to easily support the stator 4 entirely.

At this time, the spacer 16 includes fixing pins for fixing the radial iron core 1b so as to form a fan shape.

Figure 25:
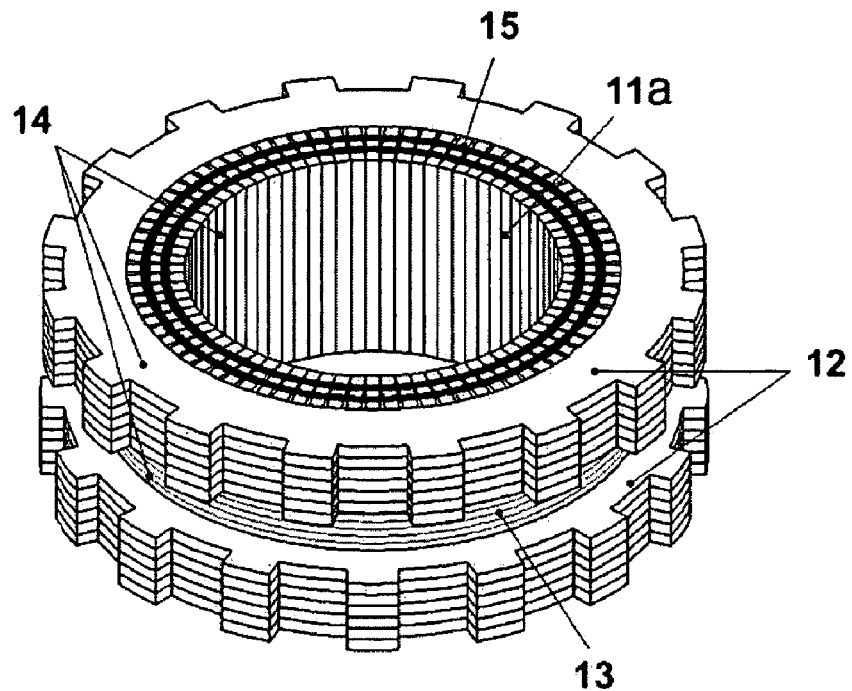
FIG. 25 is a perspective view illustrating an annular stator having radial iron core of the permanent magnet-excited transverse flux motor with an outer rotor according to the present invention.

FIG. 25 is a perspective view illustrating an annular stator 14 having a radial annular iron core 11a replacing the radial iron core 1a in the annular stator 14 of FIG. 21.

The radial annular iron core 11a is identical in function to the radial iron core 1a of a fan shape of FIG. 23, but is different in shape from the fan-shaped radial iron core 1a of FIG. 23.

Figure 26:
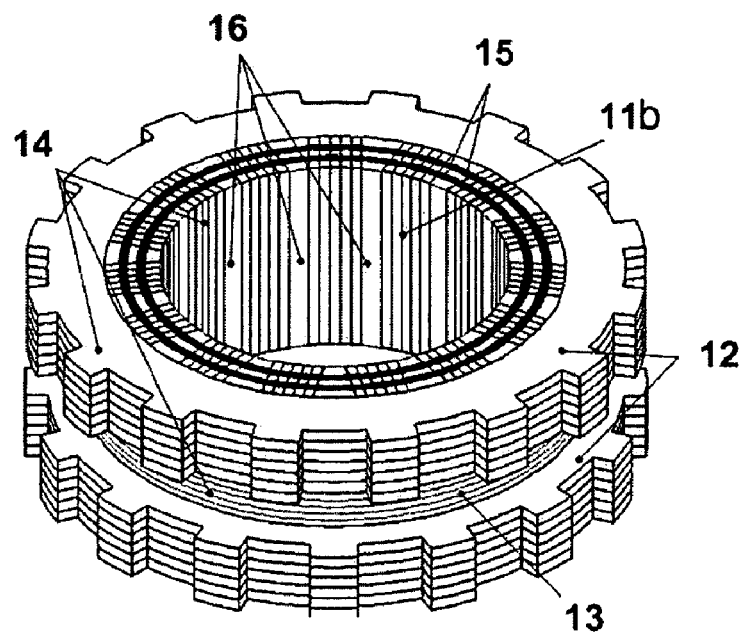
FIG. 26 is a perspective view illustrating a stator having radial iron core and spaces of the permanent magnet-excited transverse flux motor with an outer rotor according to the present invention.

In the meantime, FIG. 26 is a perspective view illustrating the annular stator powdered iron core 11 arranged equidistantly in a module unit in the annular stator 14 of FIG. 21, and a space 16 made of a non-magnetic material is interposed between one module and another adjacent module in a circumferential direction of the radial iron core 11a at uniform intervals, thus implementing a radial iron core 11b which is easy to manufacture and process.

In this case, the spacer 16 is constructed such that it is molded between respective modules of the radial annular iron core 11b so as to easily support the annular stator 14 entirely.

At this time, the spacer 16 includes fixing pins for fixing the radial annular iron core 11b so as to form a fan shape.

The radial annular iron core 11b is identical in function to the radial iron core 1b of a fan shape having the spacer 16 of FIG. 24, but is different in shape from the fan-shaped radial iron core 1b of FIG. 24.

FIGS. 27a to 27d are perspective and cross-sectional views illustrating a stator powdered iron core assembly in which the stator powdered iron core 1 and the stator laminated iron core 2 of FIG. 3 are both formed of a powdered core material.

Figure 27A:
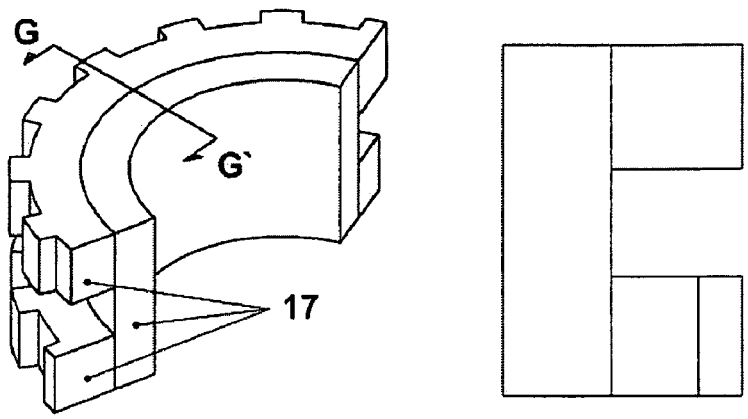
FIGS. 27a to 27d are perspective and cross-sectional views illustrating a stator powdered iron core assembly of the permanent magnet-excited transverse flux motor with an outer rotor according to the present invention.

FIG. 27(a) shows a stator powdered iron core assembly 17 with which the upper layer portion 2a and the lower layer portion 2b of the stator laminated iron core 2 of FIG. 3 are replaced and shows a cross-sectional view taken along the line G-G thereof.

Figure 27B:
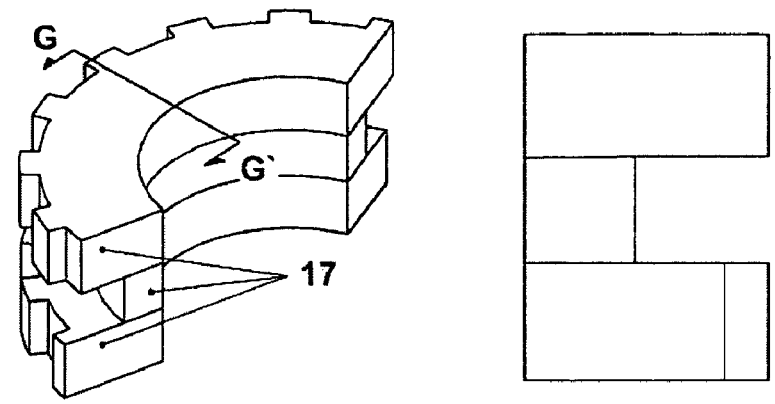

FIG. 27(b) shows a stator powdered iron core assembly 17 in which the stator laminated iron core 2 is larger than the stator laminated iron core 2 of FIG. 27(a). In FIG. 27(b), the stator powdered iron core 1 is mounted between the upper and lower layer portions 2a and 2b of the stator laminated iron core 2.

Figure 27C:
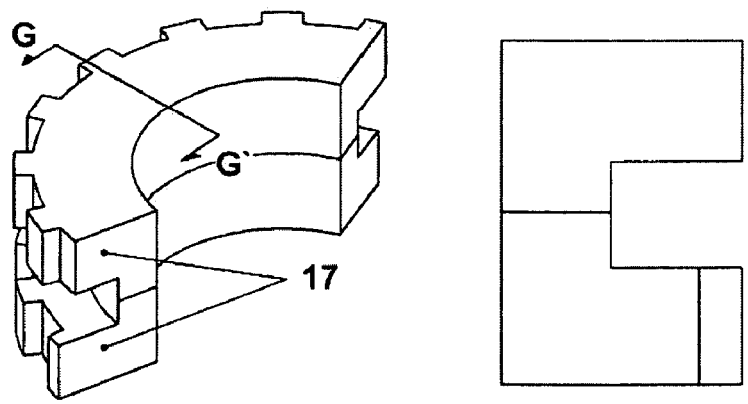
Figure 27D:
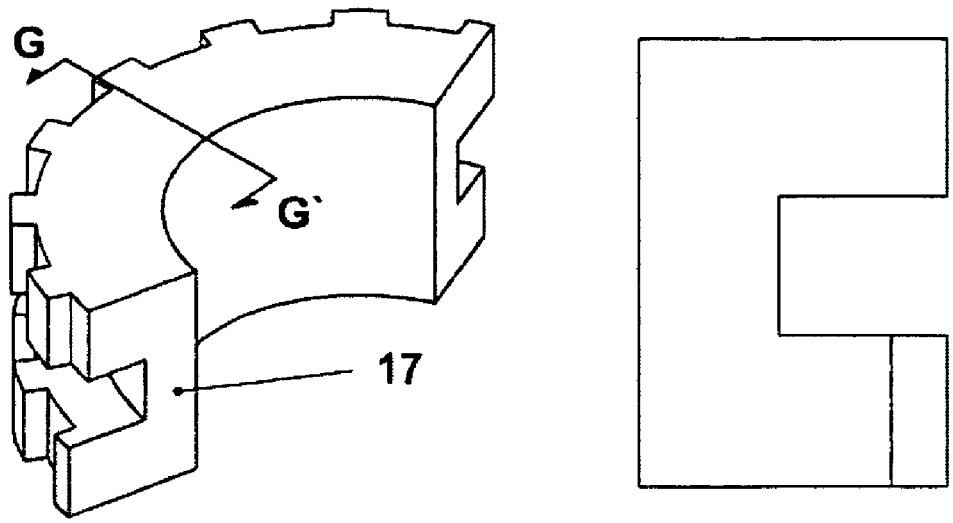

FIG. 27(c) shows a stator powdered iron core assembly 17 formed of an upper half piece and a lower half piece, and FIG. 27(d) shows a unitary stator powdered iron core assembly 17.

FIGS. 28a to 29d are perspective and cross-sectional views illustrating an annular stator powdered iron core assembly in which the annular stator powdered iron core 11 and the annular stator laminated iron core 12 are both formed of a powdered core material in the annular stator 14 of FIG. 19 of the permanent magnet-excited transverse flux motor with an outer rotor according to the present invention.

Figure 28A:
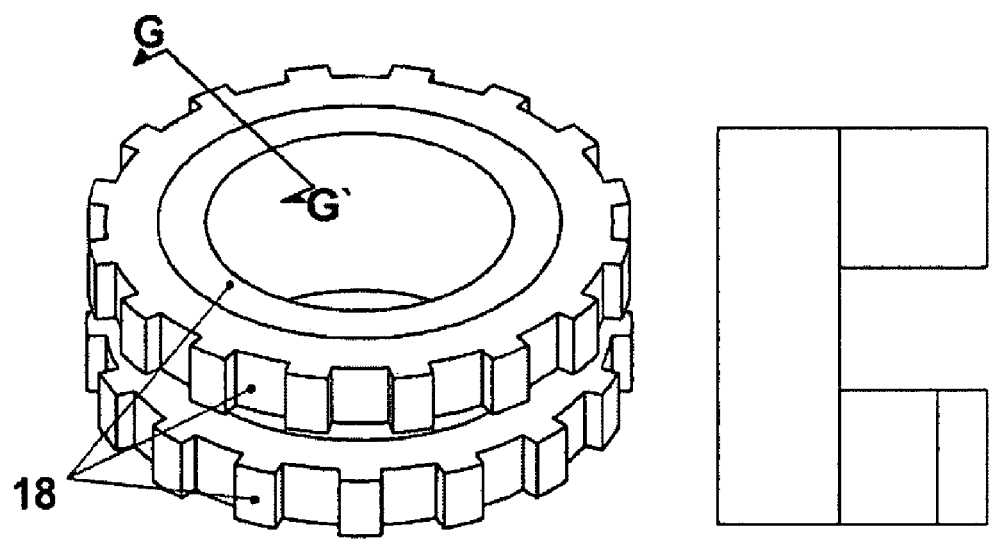
FIGS. 28a to 28d are perspective and cross-sectional views illustrating an annular stator powdered iron core assembly of the permanent magnet-excited transverse flux motor with an outer rotor according to the present invention.

FIG. 28(a) shows an annular stator powdered iron core assembly 18 with which the upper layer portion 12a and the lower layer portion 12b of the stator laminated iron core 12 of FIG. 21 are replaced and shows a cross-sectional view taken along the line G-G thereof.

Figure 28B:
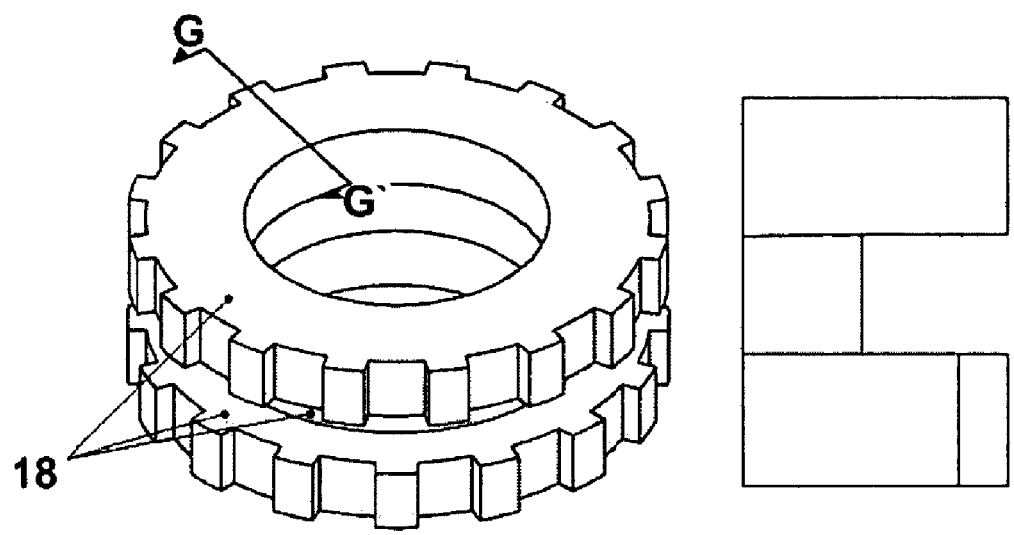

FIG. 28(b) shows a stator powdered iron core assembly 17 in which the upper and lower layer portions 12a and 12b of the annular stator laminated iron core 12 are larger than the upper and lower layer portions 12a and 12b of the annular stator laminated iron core 12 of FIG. 28(a). In FIG. 28(b), the stator powdered iron core 11 is mounted between the upper and lower layer portions 12a and 12b of the stator laminated iron core 12.

Figure 28C:
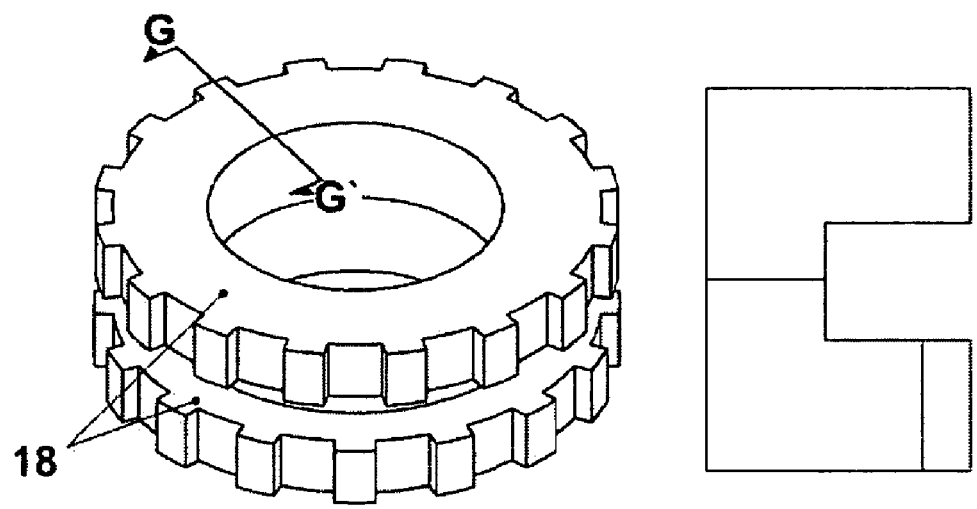
Figure 28D:
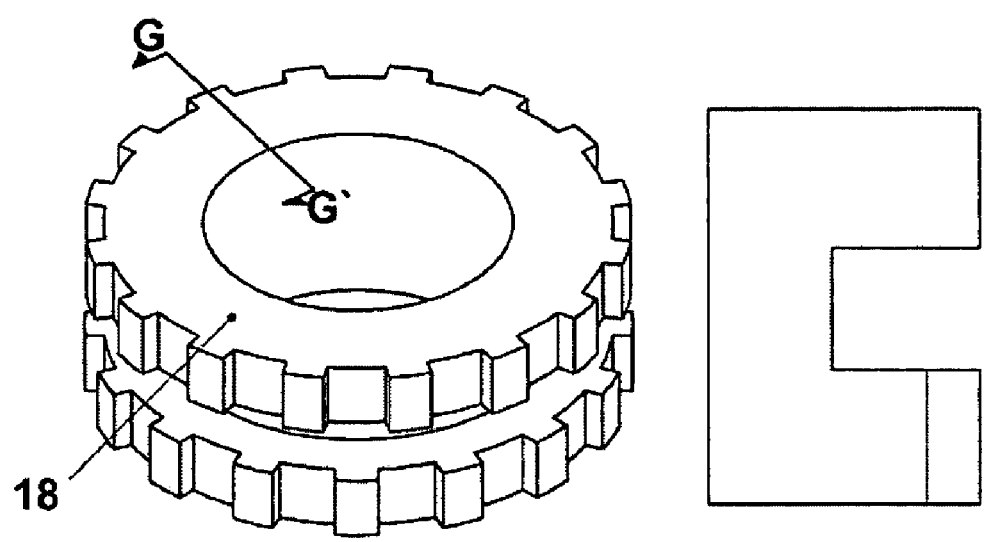

FIG. 28(c) shows an annular stator powdered iron core assembly 18 formed of an upper half piece and a lower half piece, and FIG. 28(d) shows a unitary annular stator powdered iron core assembly 18.

As apparent from the foregoing, according to the inventive permanent magnet-excited transverse flux motor with an outer rotor, an axial and/or radial laminated structure is applied to a stator powdered iron core so that a considerable amount of a core loss, i.e., an eddy current loss occurring in a conventional transverse flux motor can be reduced, thereby increasing power-generating efficiency with high output power and reducing noise and vibration.

Furthermore, the volume of the motor is decreased so as to save a material to be used, and the powdered iron core and the laminated iron core are used, thereby making its manufacture simple.

In the meantime, in applications, the permanent magnet-excited transverse flux motor with an outer rotor allows a mechanical apparatus to be replaced with an electric type driving method so as to simplify its structure and facilitate its control, thereby improving the performance of the entire system, saving a material cost and reducing a loss of energy.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A permanent magnet-excited transverse flux motor with an outer rotor, which comprises:
   a stator including a radial stator iron core formed of a plurality of rectangular parallelepipeds fixed by means of fixing pins, a pair of stator laminated iron cores stacked respectively at an upper layer portion and a lower layer portion of an outer circumference of the radial stator iron core in such fashion as to be spaced apart from each other by a certain interval, and a stator winding interposed between the upper layer portion and the lower layer portion in such fashion as to be wound around the radial stator iron core to form a multiple coil through which current flows; and
   a rotor including a plurality of rotor permanent magnets and a plurality of rotor powdered iron cores disposed on the outer circumference of the stator in such a fashion as to be are alternately arranged adjacent to one another.

2. The permanent magnet-excited transverse flux motor as set forth in claim 1, wherein the stator is formed to have a two-phase structure in which a pair of single-phase stators are so arranged as to face each other, each single-phase stator being formed in a fan shape in horizontal cross-section.

3. The permanent magnet-excited transverse flux motor as set forth in claim 1, wherein the upper and lower stator laminated iron cores respectively have a plurality of salients arranged protrudingly outwardly from the outer circumferences thereof at a uniform interval $2\tau$ of a predetermined pitch.

4. The permanent magnet-excited transverse flux motor as set forth in claim 1, wherein the stator and the rotor has an air gap $\delta$ defined therebetween so as to induce a repulsive force and an attractive force therebetween.

5. The permanent magnet-excited transverse flux motor as set forth in claim 3, wherein the plurality of salients of the upper and lower stator laminated iron cores are interlaced with one another at a uniform pole interval $\tau$ of a predetermined pitch so that a combined thrust force being created can be exerted toward one direction.

6. The permanent magnet-excited transverse flux motor as set forth in claim 2, wherein one of the pair of single-phase stators is more shifted by $0.5\tau$ clockwise than the other stator based on the central horizontal reference line.

7. The permanent magnet-excited transverse flux motor as set forth in claim 1, wherein the stator is supplied with electric power by a power supply circuit including a power supply done by direct current (DC) power source or by converting alternating current (AC) power source into DC power source, and a semiconductor device for single phase composed of four semiconductors $S_1$, $S_2$, $S_3$ and $S_4$ that are symmetrical to an H-type circuit for electrically conducting two semiconductors $S_2$ and $S_3$ to allow a positive (+) current to flow and two semiconductors $S_1$ and $S_4$ to allow negative (−) current to flow.

8. The permanent magnet-excited transverse flux motor as set forth in claim 1, wherein the stator is formed a multi-phase structure in which a second phase stator, a third phase stator, ..., $N^{-th}$ phase stator are sequentially circumferentially arranged clockwise with respect to a first phase stator, each single-phase stator being formed in a fan shape in horizontal cross-section.

9. The permanent magnet-excited transverse flux motor as set forth in claim 8, wherein the stator formed a multi-phase structure is set in its structural position such that as the number of a corresponding single-phase stator is incremented by 1 based on the first single-phase stator used as a reference phase stator, the corresponding single-phase stator whose number is incremented is more shifted by $(1/N)\tau$ clockwise than the first single-phase stator based on a reference line, and the $N^{-th}$ single-phase stator is more shifted by $\tau$ clockwise than the first single-phase stator based on a reference line.

10. The permanent magnet-excited transverse flux motor as set forth in claim 1, wherein the radial stator iron core includes a spacer disposed circumferentially at uniform intervals.

* * * * *